(12) United States Patent
Yamada

(10) Patent No.: US 8,608,195 B2
(45) Date of Patent: Dec. 17, 2013

(54) AIRBAG APPARATUS FOR A FRONT PASSENGER'S SEAT

(75) Inventor: Ikuo Yamada, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/526,625

(22) Filed: Jun. 19, 2012

(65) Prior Publication Data

US 2013/0001937 A1    Jan. 3, 2013

(30) Foreign Application Priority Data

Jun. 29, 2011   (JP) .................................. 2011-144504

(51) Int. Cl.
B60R 21/201   (2011.01)

(52) U.S. Cl.
USPC ....................................................... 280/732

(58) Field of Classification Search
USPC .................................................. 280/729, 732
See application file for complete search history.

(56) References Cited

U.S. PATENT DOCUMENTS

| | | | |
|---|---|---|---|
| 7,125,043 B2 * | 10/2006 | Amamori .................... | 280/743.1 |
| 7,213,834 B2 * | 5/2007 | Mizuno et al. ............. | 280/730.1 |
| 7,314,228 B2 * | 1/2008 | Ishiguro et al. ............ | 280/728.2 |
| 7,370,880 B2 * | 5/2008 | Hasebe ......................... | 280/729 |
| 7,568,730 B2 * | 8/2009 | Kwon ........................ | 280/743.2 |
| 7,614,655 B2 * | 11/2009 | Hasebe ....................... | 280/743.1 |
| 7,631,894 B2 * | 12/2009 | Hasebe et al. ............. | 280/743.2 |
| 7,712,769 B2 * | 5/2010 | Hasebe et al. ............. | 280/729 |
| 7,731,230 B2 * | 6/2010 | Fischer et al. ................. | 280/732 |
| 7,845,682 B2 * | 12/2010 | Lachat et al. .............. | 280/743.1 |
| 7,878,539 B2 * | 2/2011 | Maripudi et al. ............ | 280/740 |
| 7,900,958 B2 * | 3/2011 | Yamauchi et al. ............. | 280/732 |
| 7,926,844 B2 * | 4/2011 | Williams et al. ........... | 280/743.1 |
| 7,942,442 B2 * | 5/2011 | Rose et al. .................. | 280/743.1 |
| 8,096,578 B2 * | 1/2012 | Wigger et al. ............... | 280/732 |
| 8,276,936 B2 * | 10/2012 | Shimizu et al. ............ | 280/728.3 |
| 8,297,654 B2 * | 10/2012 | Lee ............................. | 280/743.1 |
| 8,328,229 B2 * | 12/2012 | Wigger et al. ............. | 280/730.1 |
| 8,407,968 B2 * | 4/2013 | Lachat et al. ................... | 53/429 |
| 8,517,417 B2 * | 8/2013 | Fujita ........................... | 280/732 |
| 8,523,223 B2 * | 9/2013 | Miyata ......................... | 280/732 |
| 2002/0084635 A1 * | 7/2002 | Tajima et al. ................ | 280/732 |
| 2005/0212275 A1 * | 9/2005 | Hasebe ....................... | 280/743.1 |
| 2006/0043709 A1 * | 3/2006 | Asai et al. ..................... | 280/732 |
| 2006/0244248 A1 * | 11/2006 | Rose et al. ................. | 280/743.1 |
| 2007/0018437 A1 * | 1/2007 | Hasebe et al. ................ | 280/729 |
| 2007/0052221 A1 * | 3/2007 | Okada et al. ................. | 280/735 |
| 2008/0042415 A1 * | 2/2008 | Hasebe ....................... | 280/743.1 |

(Continued)

FOREIGN PATENT DOCUMENTS

JP    A-2010-116117    5/2010

*Primary Examiner* — Nicole Verley

(74) *Attorney, Agent, or Firm* — Posz Law Group, PLC

(57) ABSTRACT

An airbag apparatus for a front passenger's seat is disclosed. The apparatus includes a wrapping member that wraps up an airbag in a folded-up configuration. The wrapping member includes a joint portion that is secured to an airbag housing or its vicinity together with the airbag, a main body that extends forward from the joint portion and a cover portion that extends rearward from the joint portion for deployment between the airbag and an out-of-position object in an initial phase of airbag deployment. During a folding process of the airbag, the cover portion is wrapped around a front-rear contracted bag, and a leading end of the cover portion is tucked down between an upper folded portion and a lower folded portion of the front-rear contracted bag.

5 Claims, 18 Drawing Sheets

(56) References Cited

U.S. PATENT DOCUMENTS

| | | | |
|---|---|---|---|
| 2009/0091111 A1* | 4/2009 | Fischer et al. | 280/743.1 |
| 2009/0256340 A1* | 10/2009 | Williams et al. | 280/741 |
| 2011/0241317 A1* | 10/2011 | Lee | 280/729 |
| 2012/0326421 A1* | 12/2012 | Motomochi et al. | 280/732 |

* cited by examiner

US 8,608,195 B2

AIRBAG APPARATUS FOR A FRONT PASSENGER'S SEAT

CROSS REFERENCE TO RELATED APPLICATIONS

The Present application claims priority from Japanese Patent Application No. 2011-144504 of Yamada, filed on Jun. 29, 2011, the disclosure of which is hereby incorporated into the present application by reference.

BACKGROUND OF THE INVENTION

1. Field of the Invention

The present invention relates to a mid-mount passenger airbag apparatus that includes a housing mounted in a vicinity of the rear end of top face of an instrument panel, in front of a vehicle front passenger's seat, and an airbag housed in the housing in a folded configuration for rear- and upward deployment.

2. Description of Related Art

In comparison with a top-mount airbag apparatus which is mounted on a top face of an instrument panel, a mid-mount airbag apparatus is mounted closer to a front passenger's seat. This means that a mid-mount airbag is likely to hit an object strongly in its initial deployment phase when the object is close to the housing or "out of position". Therefore the mid-mound airbag is expected to suppress its force impacting an out-of-position object.

JP2010-116117 discloses a top-mount airbag apparatus which includes around an airbag a cover cloth for suppressing the force of the airbag impacting an out-of-position object.

This conventional airbag apparatus is a top-mount apparatus that has a relatively great distance to an out-of-position object, and requires a wrapping sheet, additional to the cover cloth, for wrapping the airbag in a folded-up configuration. Therefore the conventional apparatus has room for improvement in reducing the number of parts.

SUMMARY OF THE INVENTION

An object of the present invention is to provide a mid-mount airbag apparatus for a front passenger's seat that has a limited number of parts and is capable of suppressing the airbag from pressing an out-of-position object in an undue fashion.

The object of the invention is attained by a following airbag apparatus for a front passenger's seat;

The airbag apparatus is adapted to be mounted on a rear end area of a top plane of an instrument panel in front of a front passenger's seat of a vehicle and includes:

a housing;

an inflatable airbag housed in the housing in a folded-up configuration for deployment rearward and upward after emerging from the housing in the form of a generally square conical contour whose front end is the top of the square cone, the airbag including a passenger side wall that is deployable generally vertically at a rear end so as to face the front passenger's seat, a circumferential wall that extends forward from a peripheral edge of the passenger side wall in a narrowing fashion, and a gas inlet port that is located on an underside of the circumferential wall at deployment for taking an inflation gas into the airbag from an inflator, and the airbag being secured to the housing or its vicinity at a periphery of the gas inlet port; and a wrapping member that wraps up the airbag in the folded-up configuration, the wrapping member including:

a joint portion that is secured to the housing or its vicinity together with the periphery of the gas inlet port;

a main body that extends forward from the joint portion for covering a circumference of the airbag in the folded-up configuration; and a cover portion that extends rearward from the joint portion for deployment between the airbag and an out-of-position object, which is located close to the instrument panel, in an initial phase of airbag deployment.

The folded-up configuration of the airbag is made through a folding process comprising the steps of:

preparatorily folding that folds at least the circumferential wall such that a central area in a left and right direction of a top region of the passenger side wall is brought close to the gas inlet port, thereby providing a prepatarorily folded bag;

front-rear contraction that reduces a dimension in a front and rear direction of the prepatarorily folded bag while piling a folded portion above the gas inlet port, the folded portion including an upper folded portion and a lower folded portion which are openable forward, thereby providing a front-rear contracted bag;

attaching the joint portion of the wrapping member to the periphery of the gas inlet port of the front-rear contracted bag;

covering a circumference of the front-rear contracted bag with the cover portion of the wrapping member and tucking down a leading end region of the cover portion between the upper folded portion and lower folded portion;

folding the leading end region of the cover portion into such a bellows that its region closer to the joint portion is located to the upper folded portion whereas its edge region is located to the lower folded portion; and left-right contraction that reduces a dimension in a left and right direction of the front-rear contracted bag and locates a portion of the bag here folded above the cover portion.

Then the main body of the wrapping member is wrapped around the airbag in the folded-up configuration.

In the airbag apparatus of the invention, the cover portion, which is deployable between the airbag and an out-of-position object in an initial phase of airbag deployment, is comprised of a part of the wrapping member that wraps around the folded-up configuration of the airbag. Therefore the airbag apparatus of the invention is comprised of a reduced number of parts relative to conventional airbag apparatuses for a front passenger's seat. Moreover, the airbag apparatus can be assembled with a reduced number of assembling processes since the joint portion of the wrapping member also serves to mount the cover portion to the housing.

Moreover, the cover portion is continuously formed at the rear of the joint portion which is secured to the housing or its vicinity together with the periphery of the gas inlet port, and covers a rear side, an upper side, then a front side of the front-rear contracted bag which is reduced in dimension in a front and rear direction relative to the preparatorily folded bag, in the folding process of the airbag. Accordingly, in the folded-up configuration of the airbag, the folded portions formed in the left-right contraction step are placed on the cover portion. With this configuration, in an initial phase of the airbag deployment, the folded portions formed by the left-right contraction will emerge from the housing firstly and unfurl toward the left and right in a thin configuration having not yet admitted an inflation gas inside, while protruding rear- and upward. Thereafter, the front-rear contracted bag wrapped up by the cover portion is fed with an inflation gas and protrudes out of the housing, rearward and upward. At this time, since the leading end region of the cover portion is tucked down between the upper folded portion and lower folded portion on the front side of the front-rear contracted bag, the cover portion will be prevented from being separated from the front-rear contracted bag and keep wrapping up the front-rear contracted bag. Accordingly, the cover portion will securely deploy between the airbag and an out-of-position object, if any, in an initial phase of airbag deployment.

Furthermore, the leading end region of the cover portion tucked down between the upper folded portion and lower folded portion on the front side of the front-rear folded bag is formed into such a bellows that its region closer to the joint portion is located to the upper folded portion whereas its edge region is located to the lower folded portion. With this configuration, the cover portion will unfold and protrude upward along with the deployment of the front-rear contracted bag when the front-rear contracted bag unfolds and protrudes rear- and upward. That is, the cover portion will be prevented from being separated from the airbag, and cover the airbag over a wide area in a front and rear direction. Consequently, the cover portion will be slippable relative to the airbag over a wide area, and prevent the airbag from contacting an out-of-position object directly in an initial phase of airbag deployment although the airbag apparatus is a mid-mount design closer to the out-of-position object, and the cover portion will enable the airbag to slip over the out-of-position object smoothly. Accordingly, the airbag will be kept from pressing the out-of-position object rearward in an undue fashion.

Therefore, the airbag apparatus of the invention has a limited number of parts and is manufactured with a limited number of assembling processes. Further, being a mid-mount design, the airbag apparatus of the invention is capable of suppressing its airbag from pressing an out-of-position object, which is close to the housing, in an undue fashion.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
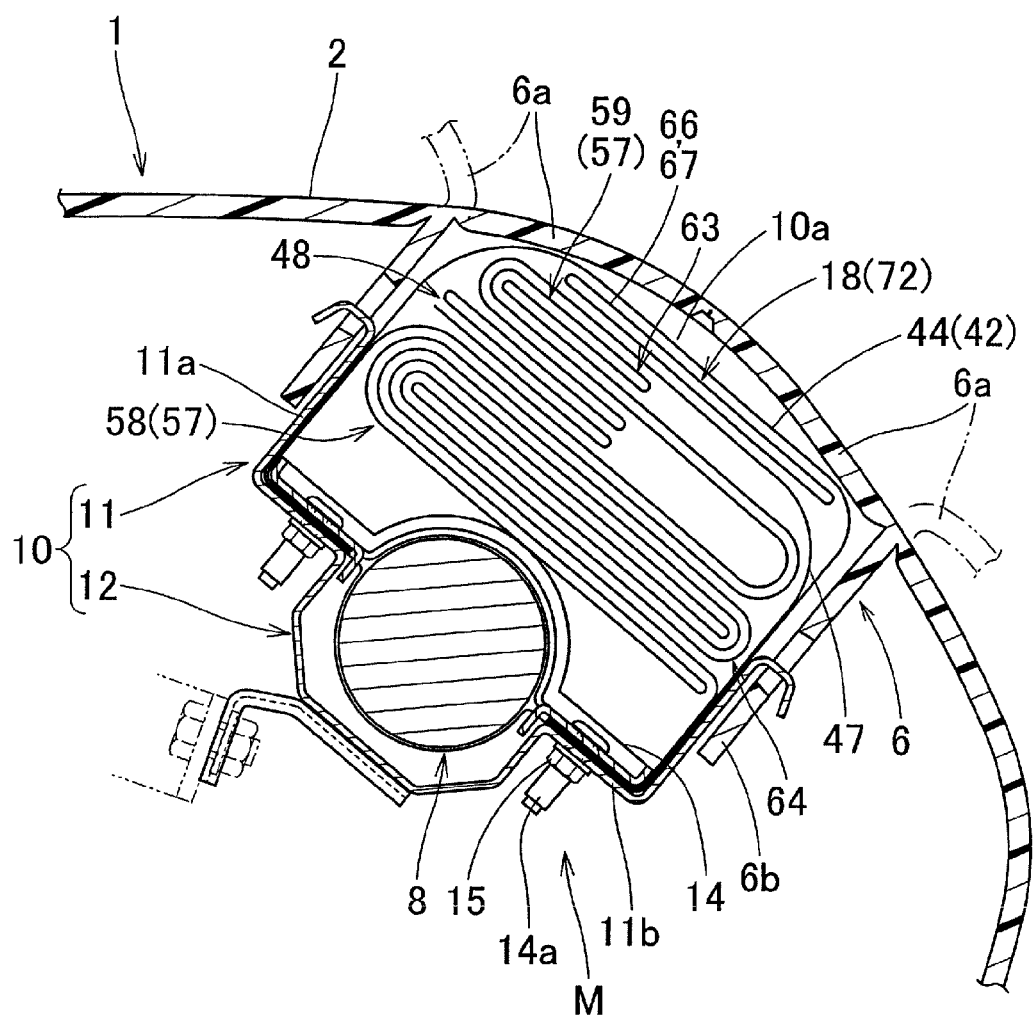
FIG. 1 is a sectional view of an airbag apparatus for a front passenger's seat embodying the present invention, taken along a front and rear direction of a vehicle.
Figure 2:
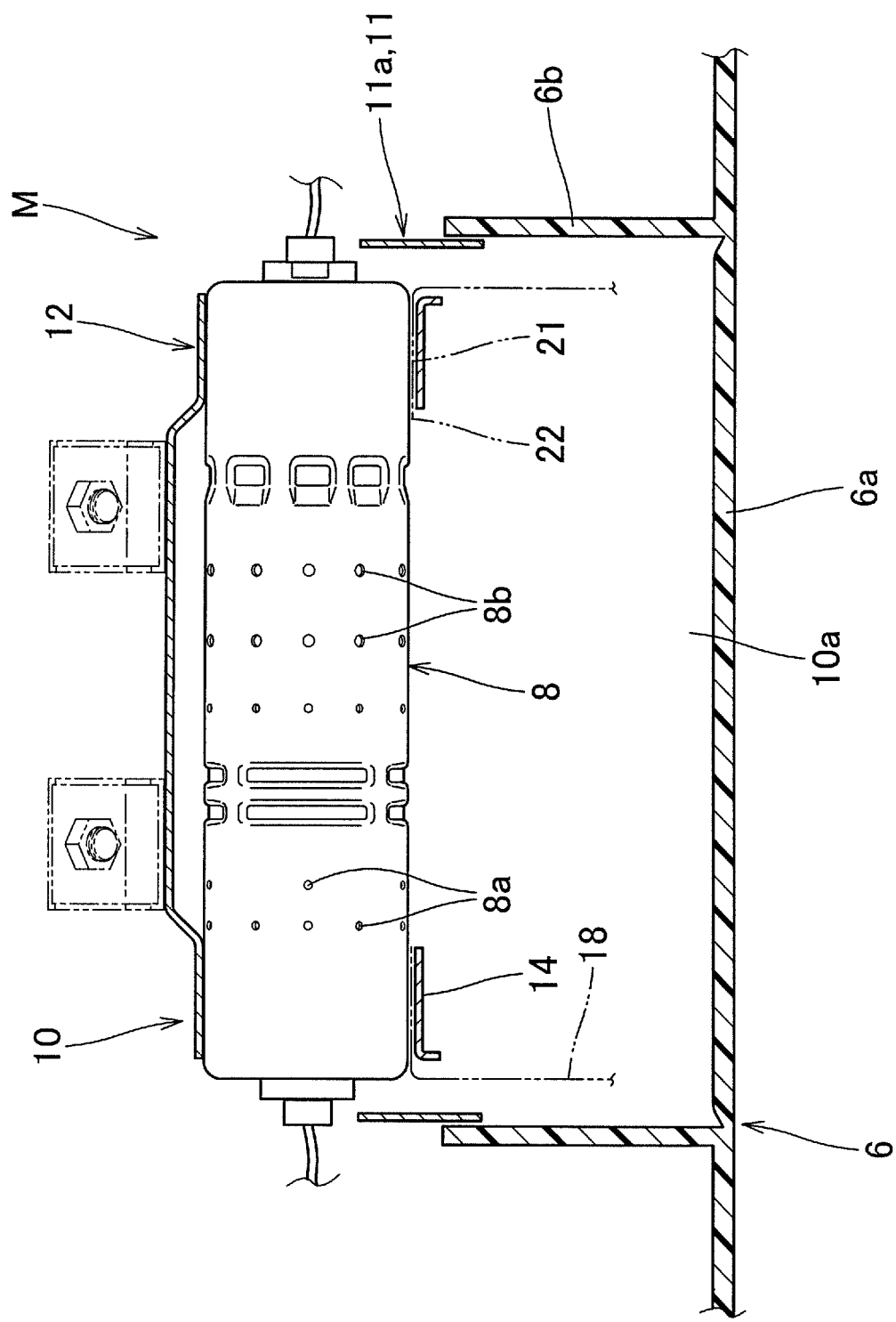
FIG. 2 is a sectional view of the airbag apparatus of FIG. 1, taken along a left and right direction of a vehicle.
Figure 14:
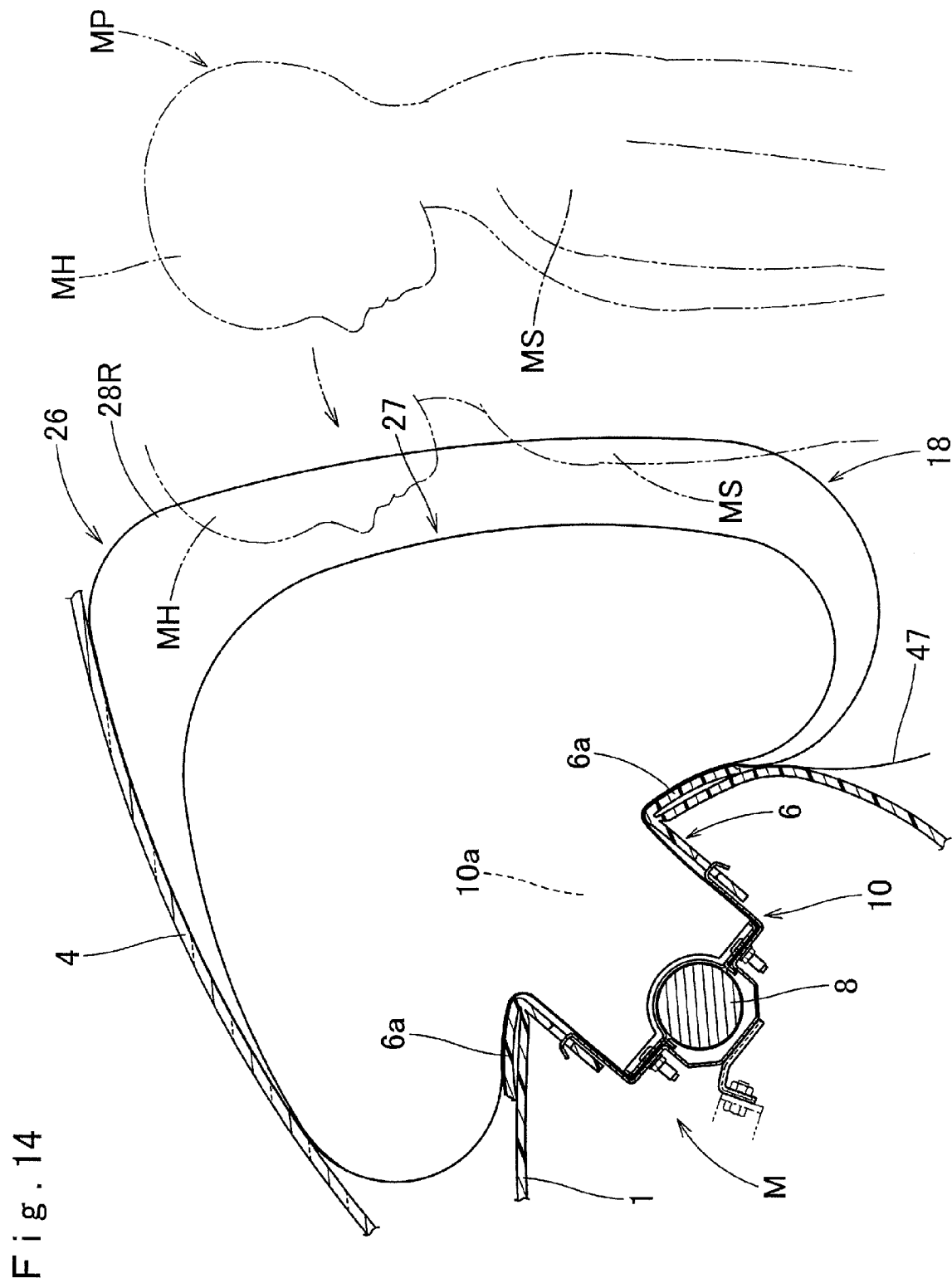
FIG. 14 is a schematic section of the airbag of FIG. 3 at full deployment, viewed from a side of a vehicle.

FIGS. 1 and 14 illustrate an airbag apparatus M for a front passenger's seat embodying the present invention. The airbag apparatus M is a mid-mount design that is mounted at a rear end area of a top plane 2 of an instrument panel or a dashboard 1 of a vehicle. As shown in FIGS. 1 and 2, the airbag apparatus M includes an airbag 18, which is folded up, an inflator 8 for supplying the airbag with an inflation gas, a case or a housing 10 that houses and holds the airbag 18 and the inflator 8, a retainer 14 that attaches the airbag 18 and inflator 8 to the case 10, and an airbag cover 6 that covers the airbag 18 on the rear upper side, and a wrapping member 42 that wraps the airbag 18 in a folded-up configuration (or a folded-up body 72, as will be described later).

Unless otherwise specified, up/down, front/rear and left/right directions in this specification are intended to refer to up/down, front/rear and left/right directions of a vehicle.

Referring to FIGS. 1 and 2, the airbag cover 6 is integral with the dashboard 1 fabricated of synthetic resin. The airbag cover 6 includes two doors 6a that are openable respectively forward and rearward to form an airbag emergence opening 10a at the top of the case 10, upon deployment of the airbag 18. The airbag cover 6 further includes around the doors 6a a joint wall 6b for engagement with the case 10.

The inflator 8 in this specific embodiment is generally columnar in outer contour and extends generally in a left and right direction. Especially in this embodiment, the inflator 8 is a dual-stage inflator that is provided on the outer circumference with two kinds of respectively numerous gas discharge ports 8a and 8b, which emit inflation gases in a different timed fashion (FIG. 2). As shown in FIG. 2, opposite ends in an axial direction of the inflator 8 are exposed on the outside of a later-described lower chamber 12 of the case 10 and respectively have connectors (reference numeral omitted) to be connected to lead wires.

Referring to FIGS. 1 and 2, the case (or housing) 10 is comprised of an upper chamber 11 that is formed into a generally rectangular parallelepiped shape with an opening at the top and a lower chamber 12 located below and communicating with the upper chamber 11. The upper chamber 11 is provided to store the airbag 18 (or a folded-up body 72) and includes a circumferential wall 11a having a generally square tubular shape for engagement with the joint wall 6b of the airbag cover 6 and a bottom wall 11b that extends inwardly from front and rear ends of the circumferential wall 11a at the bottom. The bottom wall 11b is provided with through holes (reference numeral omitted) for receiving bolts 14a of the retainer 14. The lower chamber 12 houses the inflator 8 and is smaller than the upper chamber 11 in dimensions in a front and rear and a left and right directions. The lower chamber 12 is so formed as to extend downwardly from an inner edge of the bottom wall 11b of the upper chamber 11, and has openings on left and right ends such that the opposite ends (end faces) of the inflator 8 are exposed to the outside therefrom. The lower chamber 12 further includes on the underside a bracket (reference numeral omitted) for mounting the case 10 on a vehicle body structure.

The retainer 14 is formed into a generally square annular shape whose central region in a front and rear direction curves upward along with the outer circumference of the inflator 8. The retainer 14 includes at front and rear edges a plurality of (three, respectively, in this specific embodiment) bolts 14a projecting downwardly. The retainer 14 is located inside the airbag 18 and the bolts 14a go through the peripheral area 21 of the gas inlet port 22 of the airbag 18 and the bottom wall 11b of the upper chamber 11 of the case 10 and nut 15 fastened, thus the retainer 14 is attached to the case 10. The inflator 8 is clamped between the retainer 14 and the lower chamber 12 of the case 10 when the bolts 14a are nut fastened. Thus the inflator 8 is assembled with the case 10.

Figure 3:
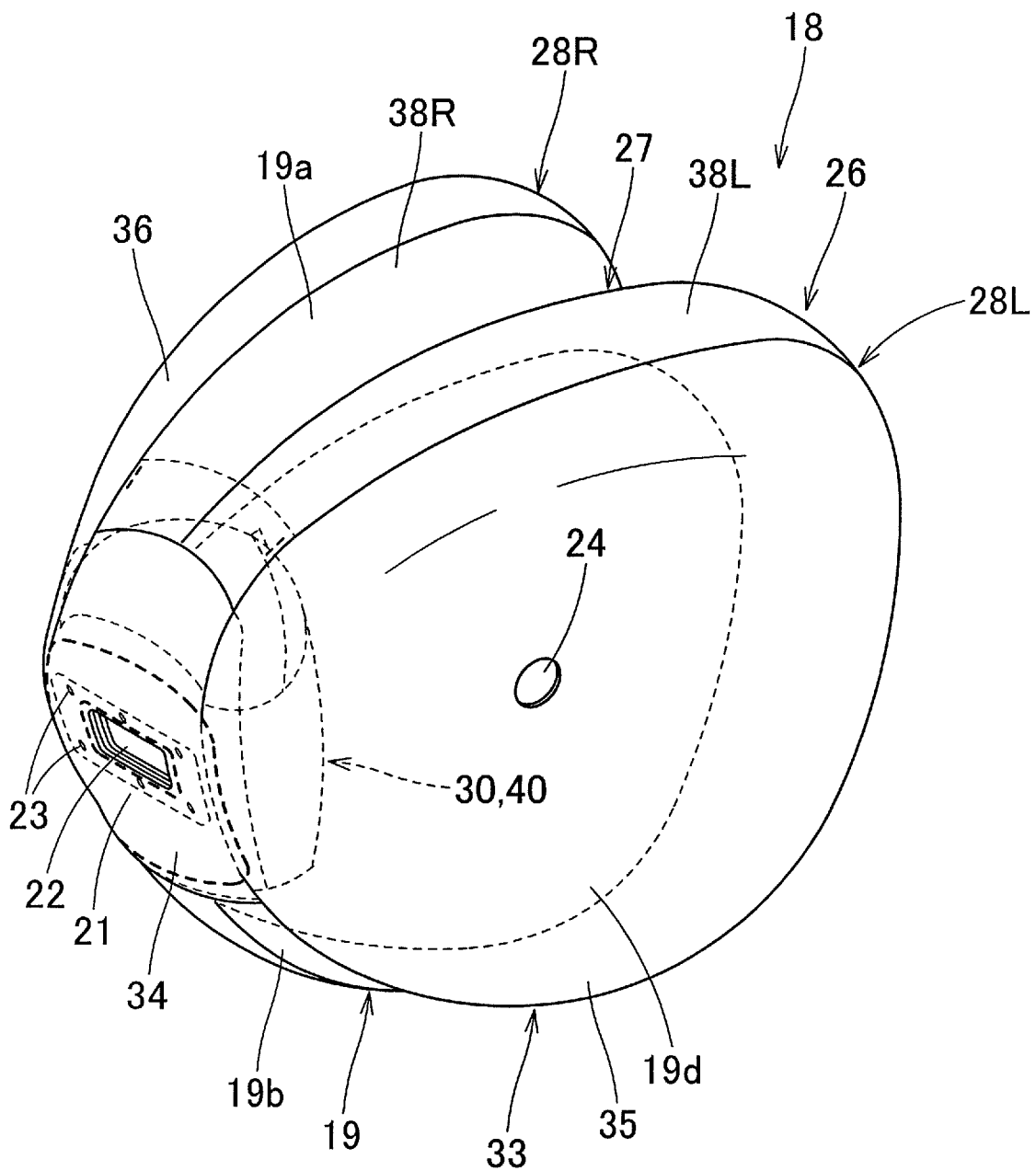
FIG. 3 is a perspective view of an airbag for use in the airbag apparatus of FIG. 1, inflated by itself and viewed from the front side.
Figure 4:
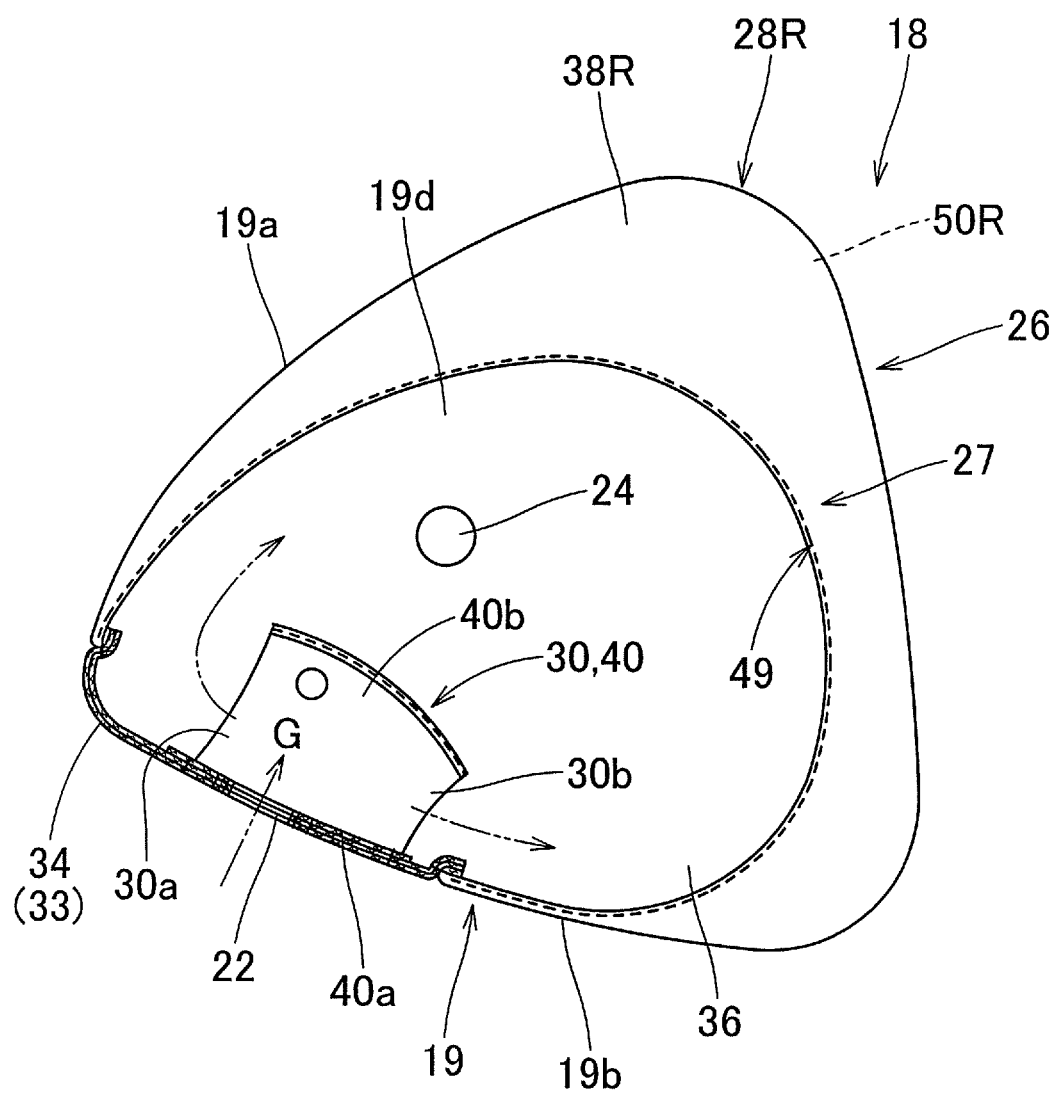
FIG. 4 is a sectional view of the airbag of FIG. 3 taken along a front and rear direction.

As shown in FIG. 14, the airbag 18 is formed into a bag deployable to stuff up a space between the top plane 2 of the dashboard 1 and a windshield 4 thereabove. More specifically, as shown in FIGS. 3 and 4, the airbag 18 is designed inflatable into a generally square conical contour whose front end is the top of the square cone. The airbag 18 includes at the rear end a passenger side wall 26 deployable generally vertically so as to face a passenger and a circumferential wall 19 extending forward from the peripheral edge of the passenger side wall 26 in a narrowing fashion. In this specific embodiment, the circumferential wall 19 is formed into a generally conical shape. The circumferential wall 19 includes an upper side wall 19a and a lower side wall 19b lying generally horizontally at the top and bottom, a left side wall 19c and a right side wall 19d extending generally along a front and rear down direction on left and right sides. At the vicinity of the center in a left and right direction of a front region of the lower side wall 19b at full inflation is a rectangular gas inlet port 22 for introducing inflation gas. In the periphery 21 of the inlet port 22 are a plurality of (six, in this embodiment) mounting holes 23 for receiving the bolts 14a of the retainer 14 to attach the peripheral region 21 of the port 22 to the bottom wall 11b of the upper chamber 11 of the case 10. That is, the airbag 18 is mounted on the case 10 at the peripheral region 21 of the gas inlet port 22. Each of the left side wall 19c and right side wall 19d of the airbag 18 is provided with a vent hole 24 for releasing extra inflation gas (FIGS. 3 and 4).

The passenger side wall 26 the airbag 18 is deployable to face toward a passenger MP seated in a front passenger's seat. In this embodiment, the passenger side wall 26 is uneven with a recess that recesses forward and extends vertically, at the center in a left and right direction, through a generally entire area in an up and down direction. Specifically, as shown in FIG. 4, the passenger side wall 26 at airbag deployment includes a recess 27 that recesses at the center in a left and right direction and a pair of raised regions 28L and 28R that relatively protrude rearward on the left and right of the recess 27. The recess 27 as well as the raised regions 28L and 28R extend continuously over a generally entire vertical area of the passenger side wall 26. As shown in FIG. 14, when the passenger side wall 26 is thrown against a passenger MP at airbag deployment, the raised regions 28L and 28R firstly arrest his/her shoulders MS and then the recess 27 receives and protects a head MH of the passenger MP when it enters into the recess 27 while the shoulders MS are arrested by the raised regions 28L and 28R. In the airbag 18, the leading end of the recess 27 is formed by a sewn seam 49 that sews inner edges 38a of later-described second base cloths 38L and 38R together whereas the tops of the raised regions 28L and 28R are formed by sewn seams 50L and 50R that sew each of circumferential edges 35a and 36a of a left portion 35 and a right portion 36 of a later-described first base cloth 33 and each of corresponding outer edges 38d of the second base cloths 38L and 38R. In this embodiment, the unevenness formed by the recess 27 and the raised regions 28L and 28R extend forward in such a manner as to enter the upper side wall 19a and lower side wall 19b of the circumferential wall 19, and continue up to the vicinity of the gas inlet port 22 (FIG. 4).

As shown in FIGS. 3 and 4, the airbag 18 is internally provided with a redirecting cloth 30. The redirecting cloth 30 is disposed over the gas inlet port 22 and has a generally cylindrical shape opened at the front and rear ends so as to redirect inflation gas G fed via the inlet port 22 forward and rearward. That is, as shown in FIG. 4, an inflation gas G fed via the inlet port 22 is supplied into the airbag 18 along a front and rear direction via front and rear openings 30a and 30b of the redirecting cloth 30. The redirecting cloth 30 is comprised of a material cloth 40 shown in FIG. 5. The material cloth 40 includes a joint portion 40a that is joined to the periphery 21 of the gas inlet port 22 and two main bodies 40b extending to the left and right from the joint portion 40a.

Figure 5:
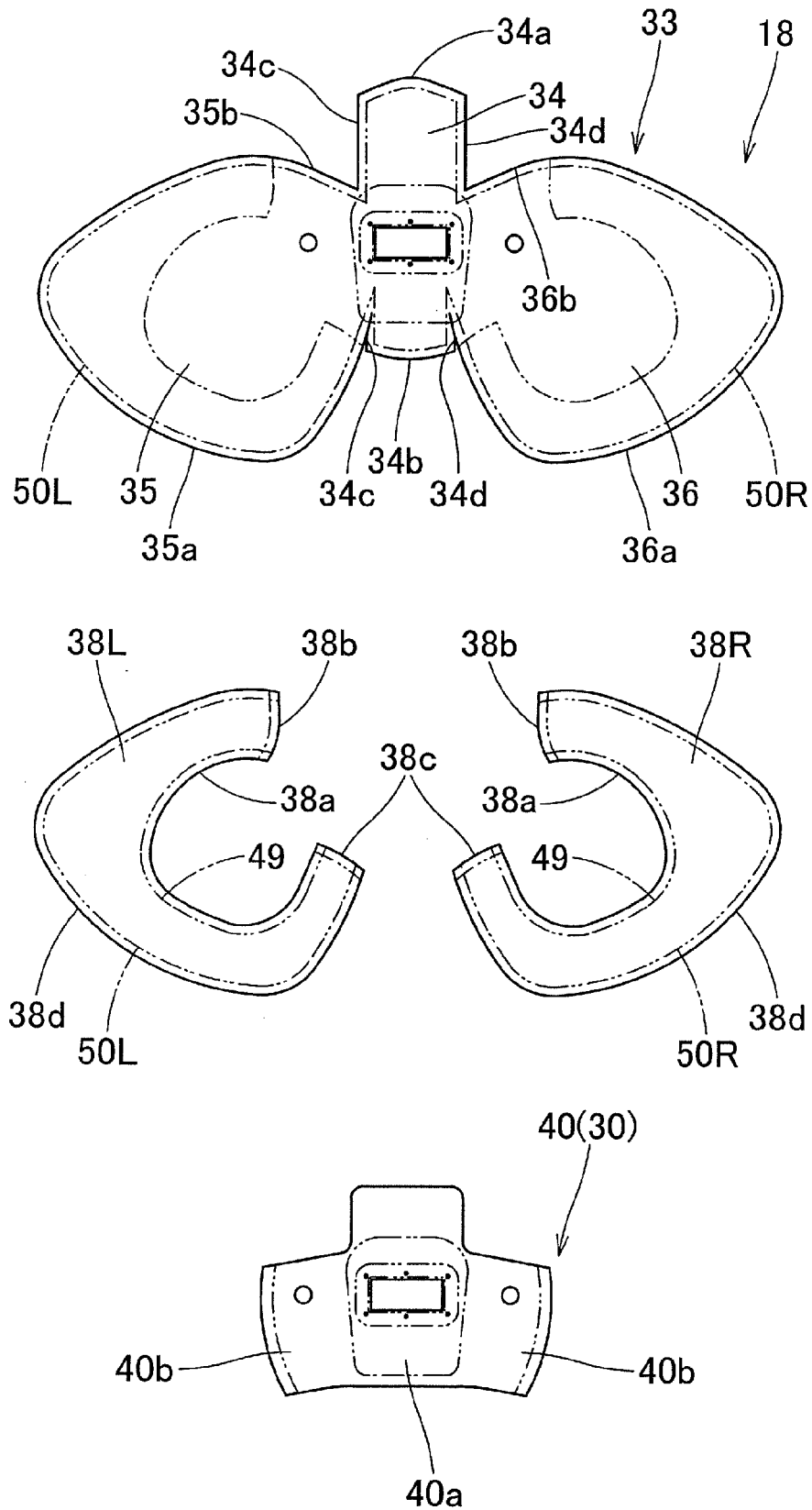
FIG. 5 illustrates components of the airbag of FIG. 3 by plan views.

The airbag 18 is made by joining peripheral edges of predetermined shaped base cloths; a first base cloth 33 that constitutes the left side wall 19c, the right side wall 19d and a front part of the lower side wall 19b and a pair of second base cloths 38L and 38R that constitute the upper side wall 19a, the passenger side wall 26 and a rear part of the lower side wall 19b, as shown in FIG. 5.

The first base cloth 33 has a laterally symmetric contour proximate to a figure of a spread butterfly. As shown in FIG. 5, the first base cloth 33 includes a generally rectangular lower part 34 constituting the peripheral region 21 of the gas inlet port 22 and left and right portions 35 and 36 each of which has a generally triangular plate shape and extends toward the left and right from the lower part 34. The lower part 34 makes the front part of the lower side wall 19b of the airbag 18 at full inflation. The left portion 35 and right portion 36 mainly constitute the left side wall 19c and right side 19d of the airbag 18 at full inflation, respectively.

A pair of the second base cloths 38L and 38R are respectively formed into a band shape curved in a generally C shape. The second base cloths 38L and 38R are so configured to divide an area of the airbag 18 at full inflation from the upper side wall 19a to a rear part of the lower side wall 19b via the passenger side wall 26 into two, left from right. In this specific embodiment, the outer edges 38d of the second base cloths 38L and 38R are generally identical in contour to the circumferential edges 35a and 36a of the left portion 35 and right portion 36 of the first base cloth 33 except root regions 35b and 36b. The first base cloth 33, second base cloths 38L and 38R and the material cloth 40 are made of flexible fabric woven by polyester yarns, polyamide yarns or the like. The fabric is not coated by such coating agent as silicone.

Figure 6:
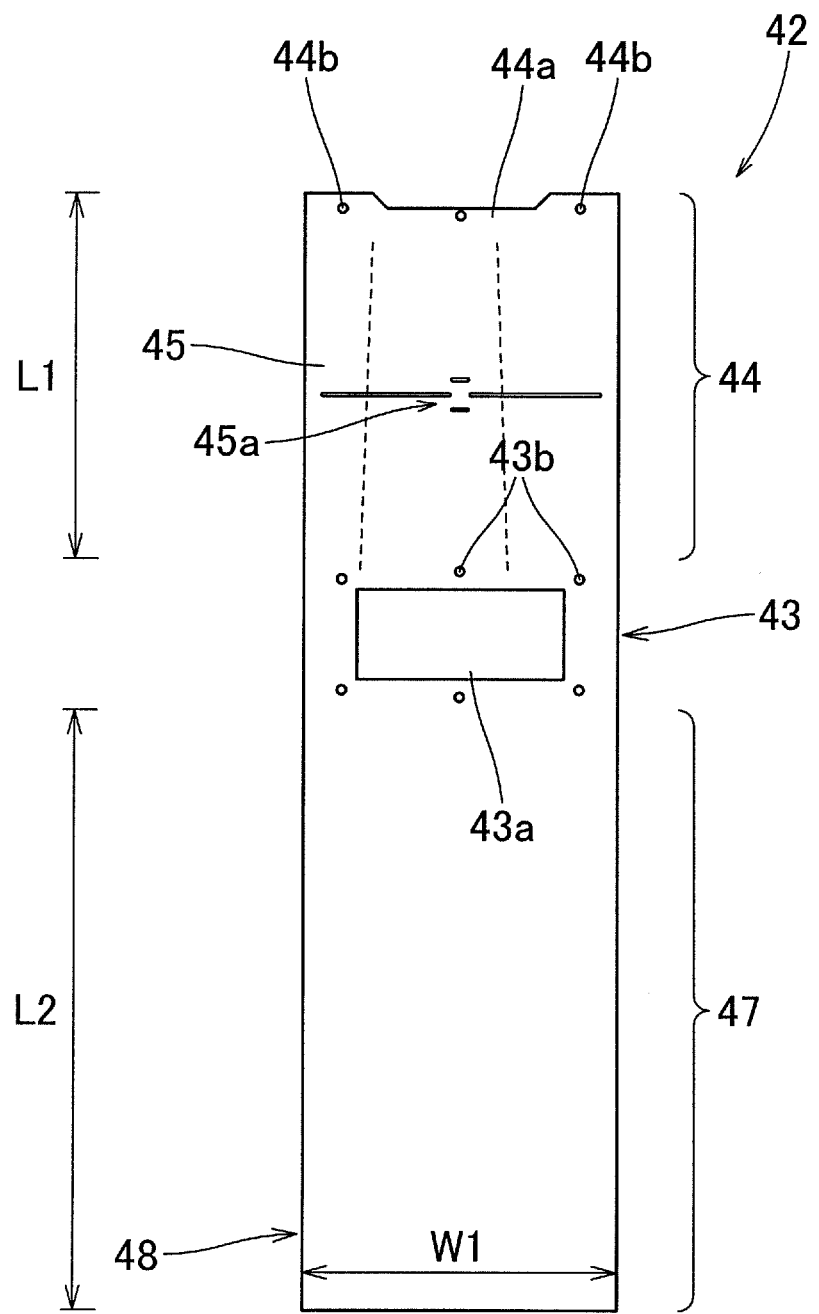
FIG. 6 is a plan view of a wrapping member for use in the airbag apparatus of FIG. 1.

Referring to FIG. 6, the wrapping member 42 is comprised of a flexible sheet member which is an uncoated fabric of polyester yarns, polyamide yarns or the like as well as the airbag 18. The wrapping member 42 is formed into a band, the width W1 of which is generally equal to the width W2 (FIG. 13B) of the folded-up body 72 that is a completely folded-up configuration of the airbag 18. The wrapping member 42 includes a joint portion 43 that is secured to the case 10 or its vicinity together with the periphery 21 of the gas inlet port 22, a main body 44 that extends forward from the joint portion 43, and a cover portion 47 that extends rearward from the joint portion 43.

The mounting portion 43 includes an opening 43a which corresponds to the gas inlet port 22 of the airbag 18 and openings 43b which correspond to the mounting holes 23. The mounting holes 43b receive the bolts 14a of the retainer 14 projecting out of the periphery 21 of the gas inlet port 22 of the airbag 18 (i.e., out of the mounting holes 23). That is, the mounting portion 43 is attached to the periphery 21 of the gas inlet port 22 and secured to the case 10 together with the periphery 21 of the gas inlet port 22.

The main body 44 is to wrap up the folded-up body 72, the length L1 (FIG. 6) of which is so sized to wrap up an entire circumference of the folded-up body 72 except laterals, i.e., front, top, and rear sides of the folded-up body 72. The leading end region 44a of the main body 44 is provided with through holes 44b for receiving the bolts 14a of the retainer 14. The main body 44 further includes on its upper portion 45, which is to cover the top of the folded-up body 72, a set of slits 45a. The slits 45a are formed generally at the center in a front and rear direction of the upper portion 45. Specifically, the slits 45a are formed on an area except left and right edges of the upper portion 45, and are comprised of two main slits that are formed into straight lines extending generally in a left and right direction and two auxiliary slits that are located respectively in front of and at the rear of inner ends of the main slits. The main body 44 is designed to separate in a front and rear direction due to tear of regions between the slits 45a when the inflator 8 is actuated and an inflation gas flows into the airbag 18.

The cover portion 47 is designed deployable between the airbag 18 and an out-of-position object, which is located close to the dashboard 1, in an initial phase of airbag deployment. The cover portion 47 is formed into an elongated band, and its length L2 (FIG. 6) in a front and rear direction is about 1.6 times as long as the length L1 of the main body 44. This length ensures the cover portion 47 to be located between the airbag 18 and an out-of-position object (e.g., an out-of-position passenger NP1 or a small out-of-position passenger NP2 such as an infant) in an initial phase of airbag deployment, and enables the airbag 18 after contacting the out-of-position object to slip over the object smoothly.

Manufacturing of the airbag apparatus M is now described, including the on-board mounting work.

Firstly, the airbag 18 is manufactured. The joint portion 40a of the material cloth 40 is placed on the lower part 34 of the first base cloth 33 as flattened and is sewn thereto at the position to be the periphery 21 of the gas inlet port 22. Then punching work is applied to form the gas inlet port 22 and mounting holes 23. Then the main bodies 40b of the material cloth 40 are sewn together at the leading ends to form the redirecting cloth 30. Subsequently, the second base cloths 38L and 38R are overlaid one on the other and the inner edges 38a thereof are sewn together to provide the sewn seam 49. Subsequently, the second base cloths 38L and 38R are opened so that seam allowances of the inner edges 38a are disposed inside and front edges 38b of the cloths 38L and 38R form a single, generally straight line, and these front edges 38b are sewn to the front edge 34a of the lower part 34 of the first base cloth 33. Likewise, rear edges 38c of the second base cloths 38L and 38R are sewn to the rear edge 34b of the lower part 34 in the first base cloth 33. Then front and rear left edges 34c of the lower part 34 are sewn to the root regions 35b of the left portion 35, whereas front and rear right edges 34d are sewn to the root regions 36b of the right portion 36. Thereafter, the circumferential edge 35a of the left portion 35 and the outer edge 38d of the second base cloth 38L are sewn together to provide the sewn seam 50L whereas the circumferential edge 36a of the right portion 36 and the outer edge 38d of the second base cloth 38R are sewn together to provide the sewn seam 50R. The airbag 18 is completed if reversed inside out utilizing the gas inlet port 22 so that seam allowances of edge areas may not appear outside.

Subsequently, the airbag 18 is folded up, with the retainer 14 housed there inside such that the bolts 14a project out of the mounting holes 23. The folding process includes a preparatory folding step, a front-rear contraction step a left-right contraction step. Front/rear and left/right directions in the folding process are based on each direction extending along an opening plane of the gas inlet port 22 of the airbag 18.

Figure 7:
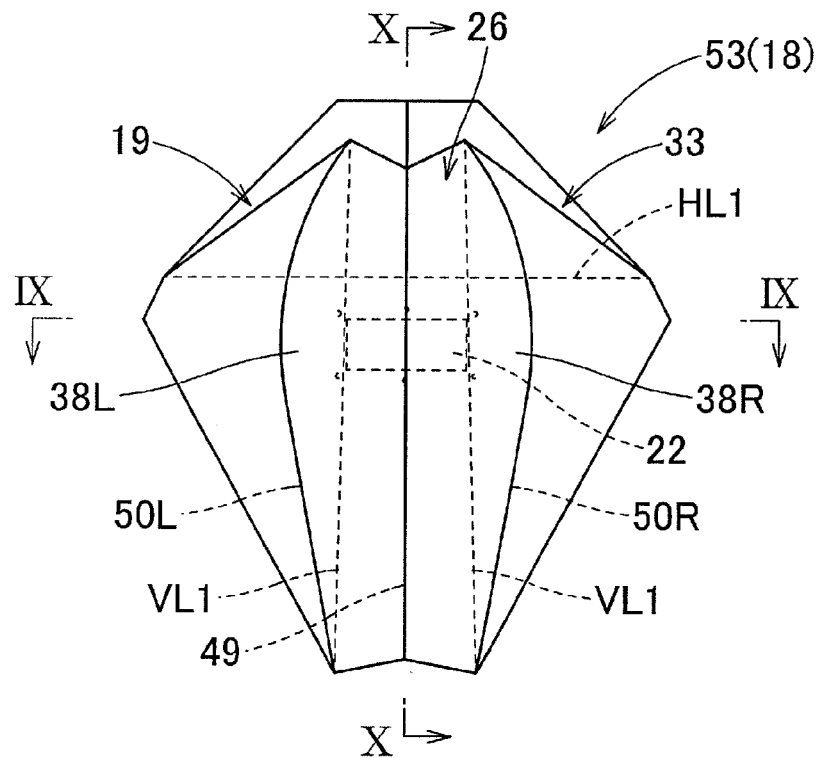
FIG. 7 illustrates a preparatorily folded configuration of the airbag of FIG. 3 from a side of a passenger side wall.
Figure 8:
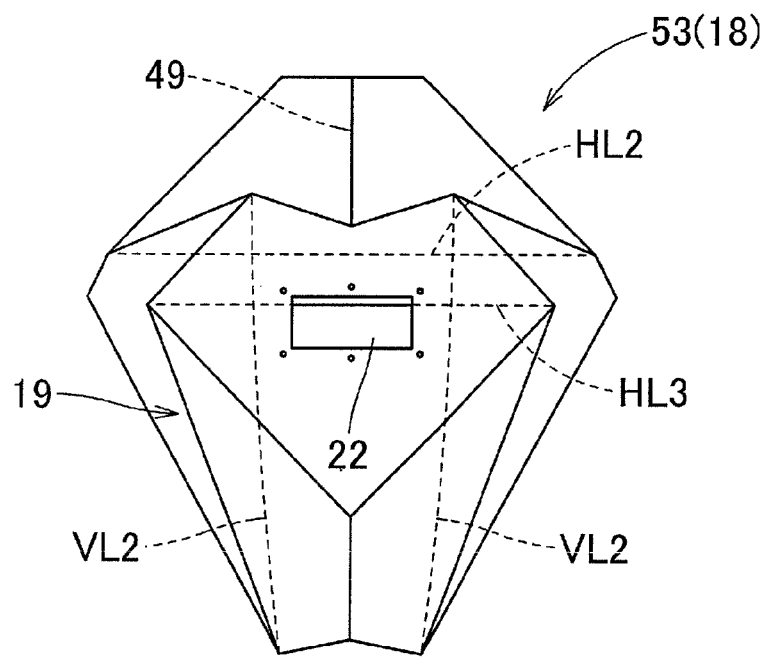
FIG. 8 illustrates the preparatorily folded configuration of the airbag of FIG. 3 from a side of a gas inlet port.
Figure 9:
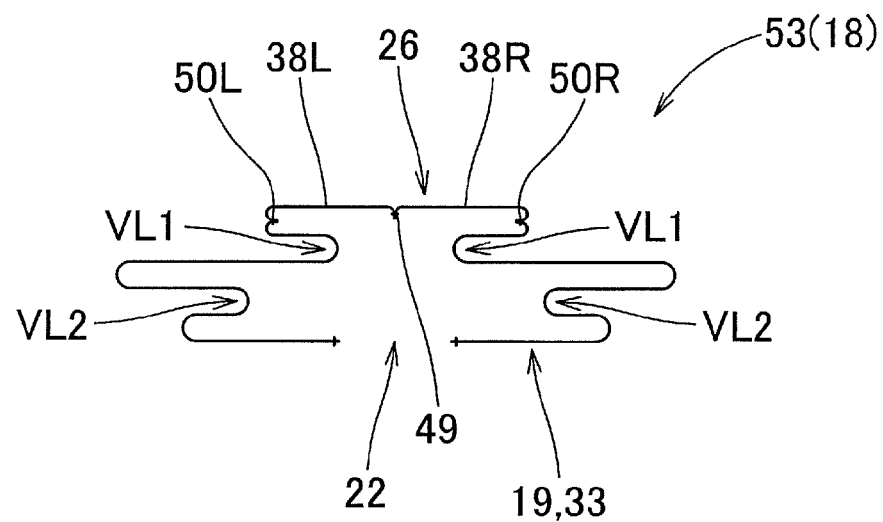
FIG. 9 is a sectional end view taken along line IX-IX.
Figure 10:
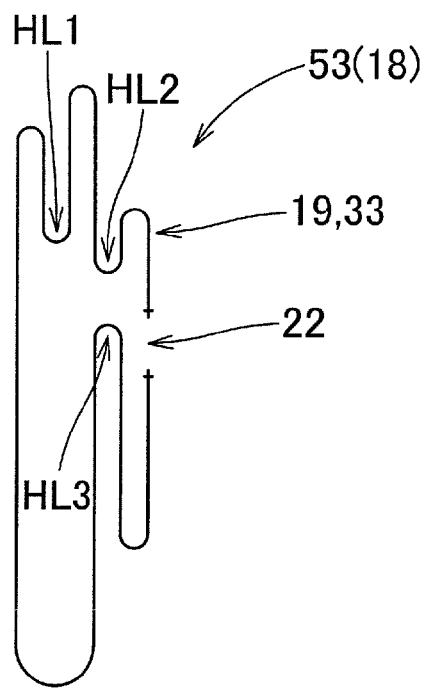
FIG. 10 is a sectional end view taken along line X-X.

The preparatory folding step provides a preparatorily folded bag 53 shown in FIGS. 7 to 10, wherein a central area of the passenger side wall 26 of the airbag 18 (i.e., an area between the sewn seams 50L and 50R) is flattened as a whole in a front and rear direction by opening or separating the sewn seams 50L and 50R toward the left and right relative to the sewn seam 49 (i.e. the leading end of the recess 27) which is located generally at the center in a left and right direction of the passenger side wall 26. More specifically, as shown in FIGS. 7 and 8, the preparatorily folded bag 53 has a laterally symmetric configuration wherein the sewn seam 49 is arranged along a front and rear direction at the center in a left and right direction and a top center region 26a of the passenger side wall 26, which is to be located at the top at full deployment, is located to oppose the gas inlet port 22 in an up and down direction, whereas the circumferential wall 19 and regions of the passenger side wall 26 outside of (i.e., on the left and right of) the sewn seams 50L and 50R are folded up. In this specific embodiment, as shown in FIGS. 7 to 10, the circumferential wall 19 and the regions of the passenger side wall 26 outside of (i.e., on the left and right of) the sewn seams 50L and 50R are tucked down on a pair of valley-fold lines VL1 and on another pair of valley-fold lines VL2, all of which fold lines extend generally in a front and rear direction. The circumferential wall 19 is also tucked down on valley-fold lines HL1, HL2 and HL3 extending in a left and right direction.

Figure 11A:
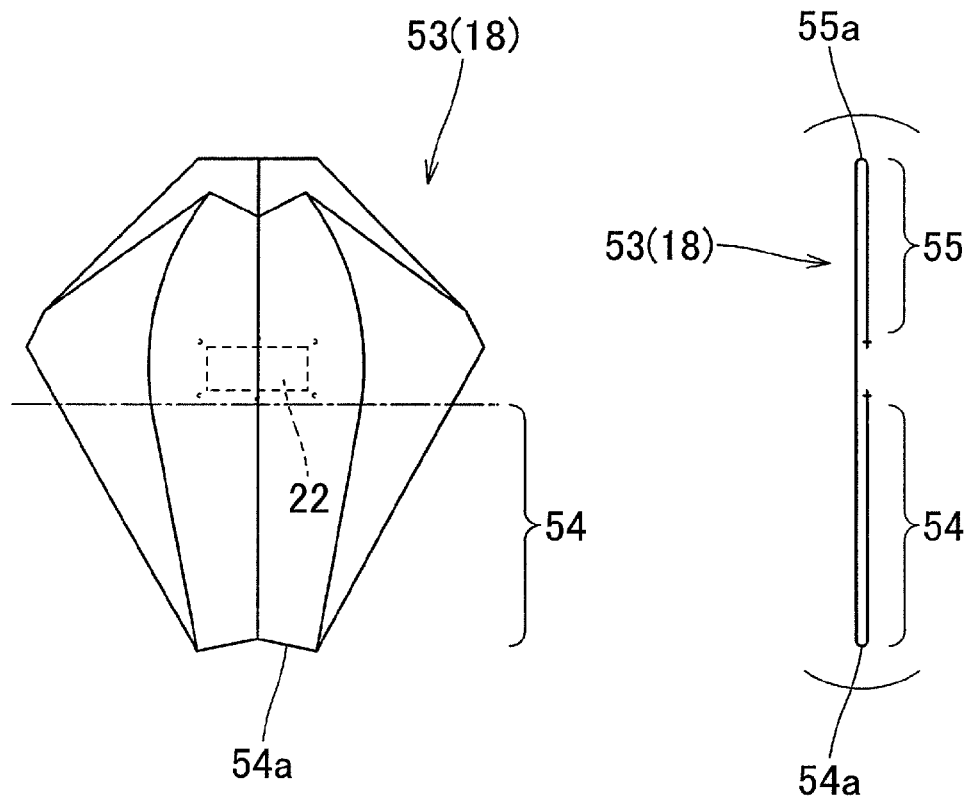
FIGS. 11A and 11B illustrate a folding step following the preparatorily folding.
Figure 11B:
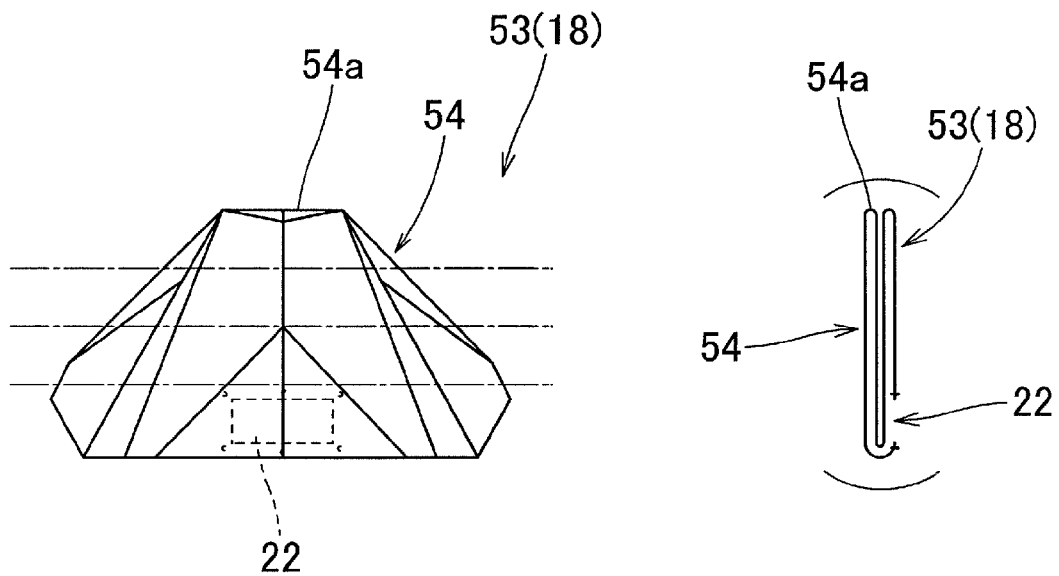
Figure 12A:
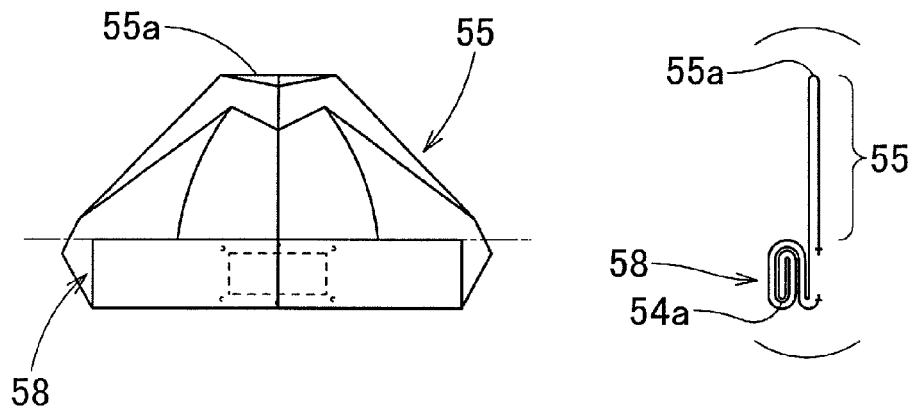
FIGS. 12A, 12B and 12C illustrate a folding step following the step shown in FIG. 11B.
Figure 12B:
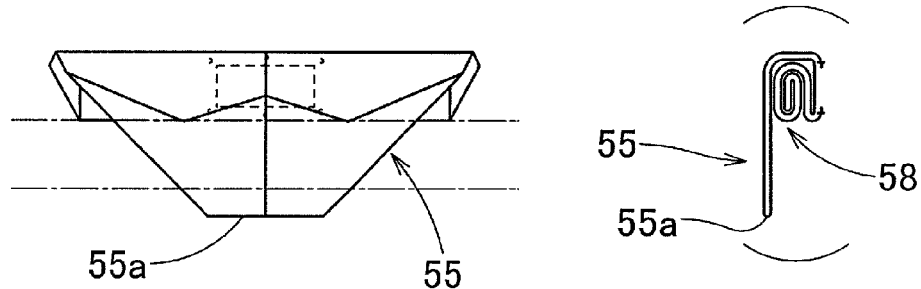
Figure 12C:
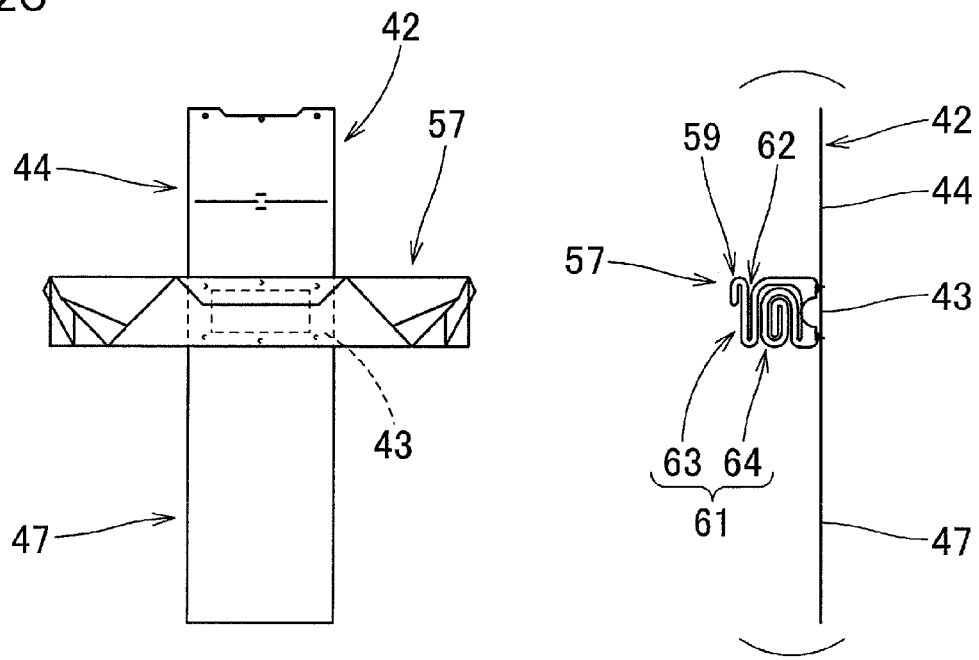

In the front-rear contraction step, the preparatorily folded bag 53 is folded up and reduced in width in a front and rear direction. Specifically, as shown in FIGS. 11A, 11B and 12A, a rear region 54 of the preparatorily folded bag 53, which is located at the rear of the gas inlet port 22, is rolled from the rear end 54a toward the circumferential wall 19 (i.e., on the underside) on creases extending in a left and right direction, thereby providing a rolled portion 58 (or a rear folded portion), which is located above the gas inlet port 22. Subsequently, as shown in FIGS. 12B and 12C, a front region 55 of the preparatorily folded bag 53, which is located in front of the gas inlet port 22, is folded in a bellows fashion on creases extending in a left and right direction such that the front end 55a is brought close to the gas inlet port 22, thereby forming a bellows-folded portion 59 or a front folded portion. The bellows-folded portion 59 is then placed on the rolled portion 58, thus completing the front-rear contraction and providing a front-rear contracted bag 57 which is so sized, in a front and rear direction, to fit in the upper chamber 11 of the case 10. As shown in FIG. 12C, the bellows-folded portion (front folded portion) 59 is so arranged as to open forward, i.e., to form an opening 62. That is, the front-rear contracted bag 57 includes a piled (folded) portion 61 that is comprised of an upper folded portion 63, which is a portion of the bellows-folded portion 59 located above the opening 62, and a lower folded portion 64, which included a portion of the bellows-folded portion 59 located below the opening 62 and the rolled portion 58.

Figure 13A:
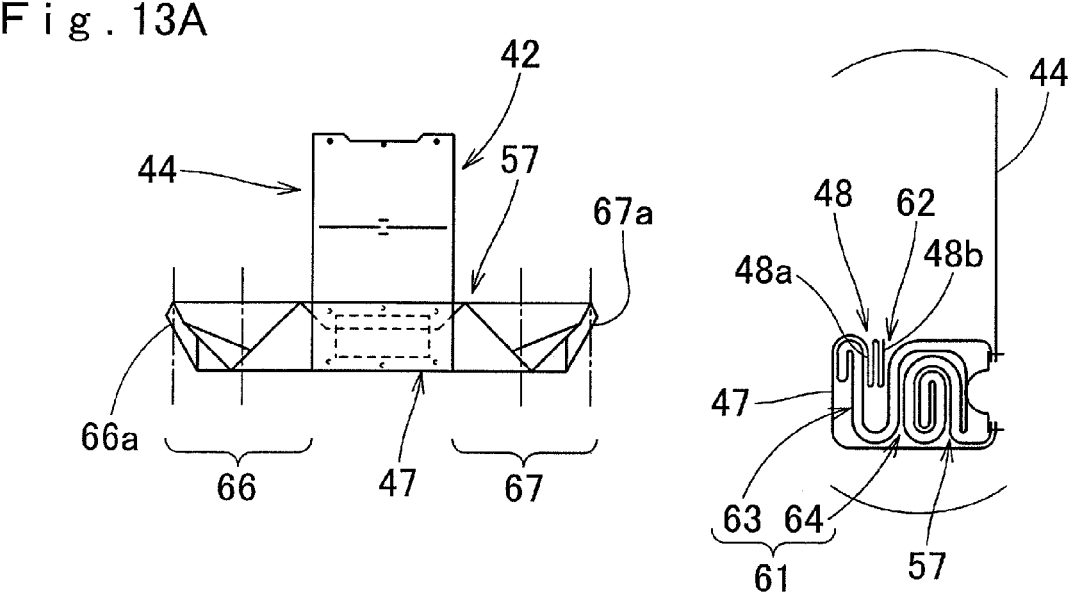
FIGS. 13A, 13B and 13C illustrate a folding step following the step shown in FIG. 12C.

After the front-rear contraction step, the joint portion 43 of the wrapping member 42 is attached to an underside of the periphery 21 of the gas inlet port 22 by putting the bolts 14 of the retainer 14 through the openings 43b as shown in FIG. 12C. Subsequently, the cover portion 47 of the wrapping member 42, which extends rearward from the front-rear contracted bag 57, is wrapped around the rear side, the upper side, then the front side of the bag 57 at the center in a left and right direction of the bag 57, as shown in FIG. 13A. Then a leading end region 48 of the cover portion 47 is tucked down between the upper folded portion 63 and lower folded portion 64 (i.e., in a vertically middle portion of the bellows-folded portion 59) via the opening 62. At this time, the leading end region 48 is folded into such a bellows that a root side portion 48a, which is closer to the joint portion 43, is located to the upper folded portion 63 whereas an edge region 48b is located to the lower folded portion 64. The bellows folding of the leading end region 48 is smaller in width than the rolled portion 58 and bellows-folded portion 59 so as to have multiple folds, as shown in FIG. 13A.

Figure 13B:
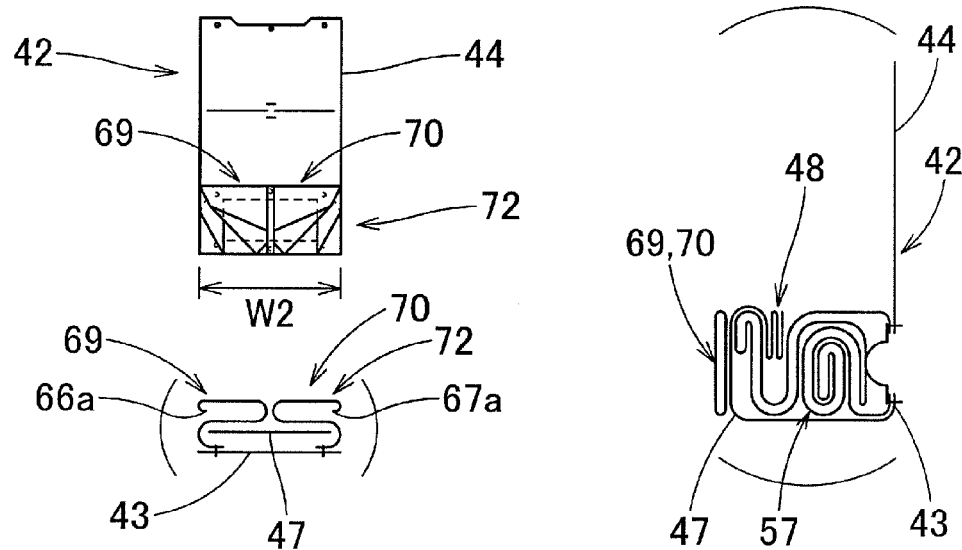

In the following left-right contraction step, the front-rear contracted bag 57 is reduced in width in a left and right direction. Specifically, as shown in FIGS. 13A and 13B, a left portion 66 and a right portion 67 of the front-rear contracted bag 57, which are located on the left and right of the cover portion 47, respectively, are folded back at vicinities of the left and right edges of the cover portion 47 on creases extending in a front and rear direction, and then rolled such that ends 66a and 67a of the left and right portions 66 and 67 are directed toward the gas inlet port 22. The rolled portions, namely a left folded portion 69 and a right folded portion 70, are located above the gas inlet port 22, thus completing the left-right contraction and providing a folded-up body 72 which is so sized, in a left and right direction, to fit in the upper chamber 11 of the case 10. In the folded-up body 72, the left folded portion 69 and right folded portion 70 that are comprised of the left portion 66 and right portion 67 of the front-rear contracted bag 57 are located on the cover portion 47 of the wrapping member 42.

Figure 13C:
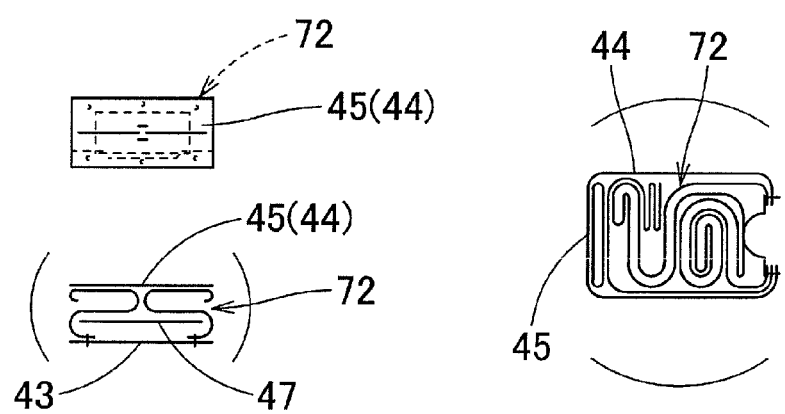

Subsequently, as shown in FIG. 13C, the main body 44 of the wrapping member 42 extending forward from the folded-up body 72 is wrapped around the front side, the upper side and then the rear side of the folded-up body 72, and then the bolts 14a of the retainer 14 projecting out of the folded-up body 72 are inserted through the through holes 44b of the leading end region 44a in order to hold the leading end region 44a. Thus the main body 44 (the wrapping member 42) wraps the folded-up body 72.

Then the inflator 8 is set in the lower chamber 12 of the case 10, whereas the folded-up body 72 is stored inside the upper chamber 11 such that the bolts 14b of the retainer 14 project out of the bottom wall 11b of the upper chamber 11. If the bolts 14a are fastened with the nuts 15, the airbag 18 and the inflator 8 are assembled with the case 10. At the same time, the joint portion 43 of the wrapping member 42 is secured to the case 10 together with the periphery 21 of the gas inlet port 22 of the airbag 18.

Thereafter, the circumferential wall 11a of the upper chamber 11 of the case 10 is joined with the joint wall 6b of the airbag cover 6, which is already on board, and the brackets (reference numeral omitted) of the case 10 are secured to the vehicle body structure, thus the airbag apparatus M is mounted on the vehicle.

In the event of a frontal collision of a vehicle equipped with the airbag apparatus M, an inflation gas is discharged from the gas discharge ports 8a and 8b of the inflator 8 to inflate the airbag 18. When inflated, the airbag 18 breaks the regions in between the slits 45a in the upper portion 45 of the main body 44 of the wrapping member 42, and pushes and opens the doors 6a of the airbag cover 6 as shown in FIG. 14. Then the airbag 18 protrudes rear- and upward from the emergence opening 10a of the case 10 provided by the opening of the doors 6a, and deploys rearward in such a manner as to stuff up a space between the top plane 2 of the dashboard 1 and the windshield 4. Thus the airbag 18 completes inflation as shown in FIG. 14.

In the airbag apparatus M, the cover portion 47, which is deployable between the airbag 18 and an out-of-position object (or an out-of-position passenger) in an initial phase of airbag deployment, is comprised of a part of the wrapping member 42 that is wrapped around the folded-up body 72 of the airbag 18. Therefore the airbag apparatus M is comprised of a reduced number of parts relative to conventional airbag apparatuses for a front passenger's seat. Moreover, the airbag apparatus M can be assembled with a reduced number of assembling processes since the joint portion 43 of the wrapping member 42 also serves to mount the cover portion 47 to the case 10.

Figure 15:
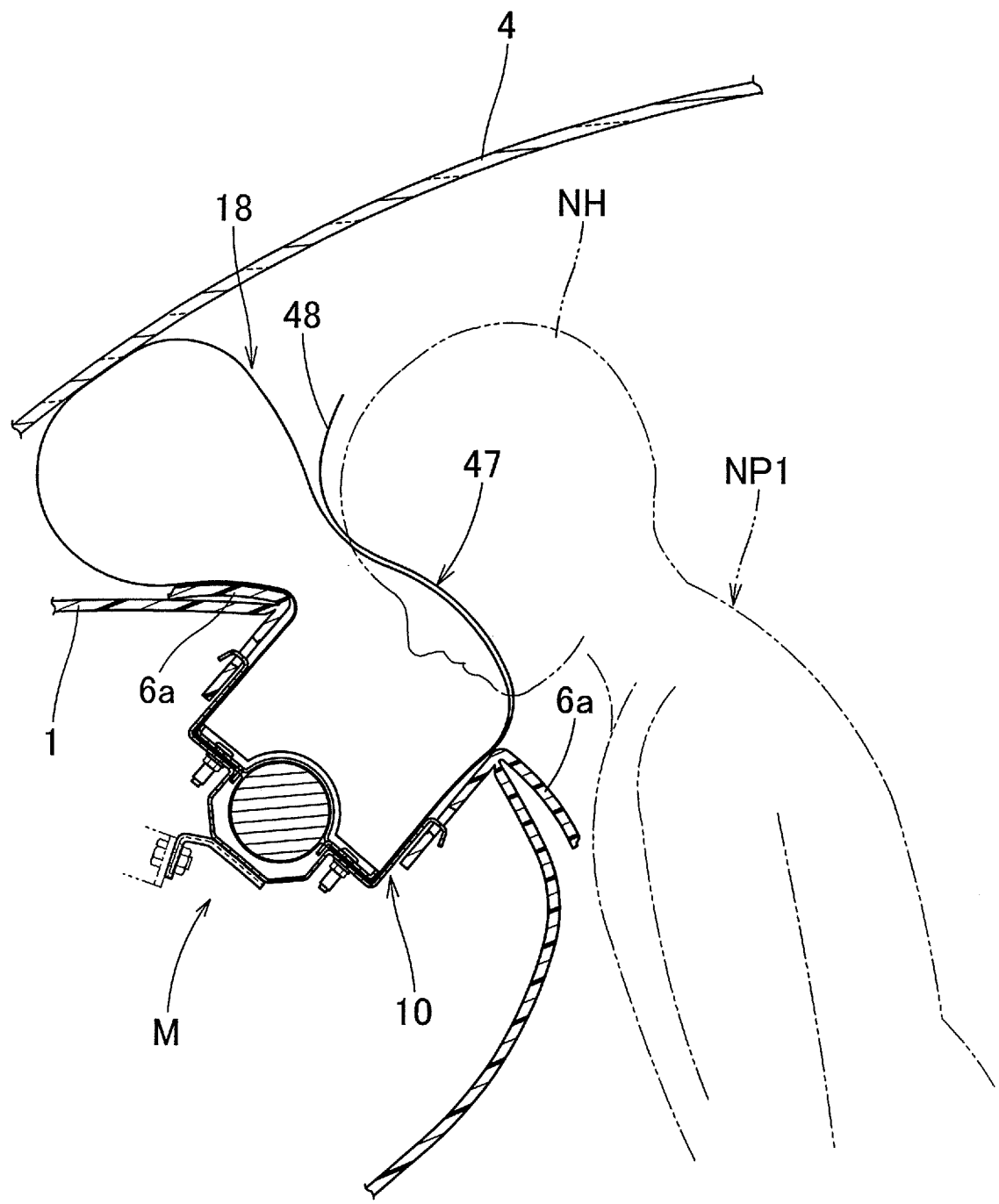
FIG. 15 is a schematic section taken along a front and rear direction, showing the way the airbag of FIG. 3 is thrown against an out-of-position passenger.
Figure 16:
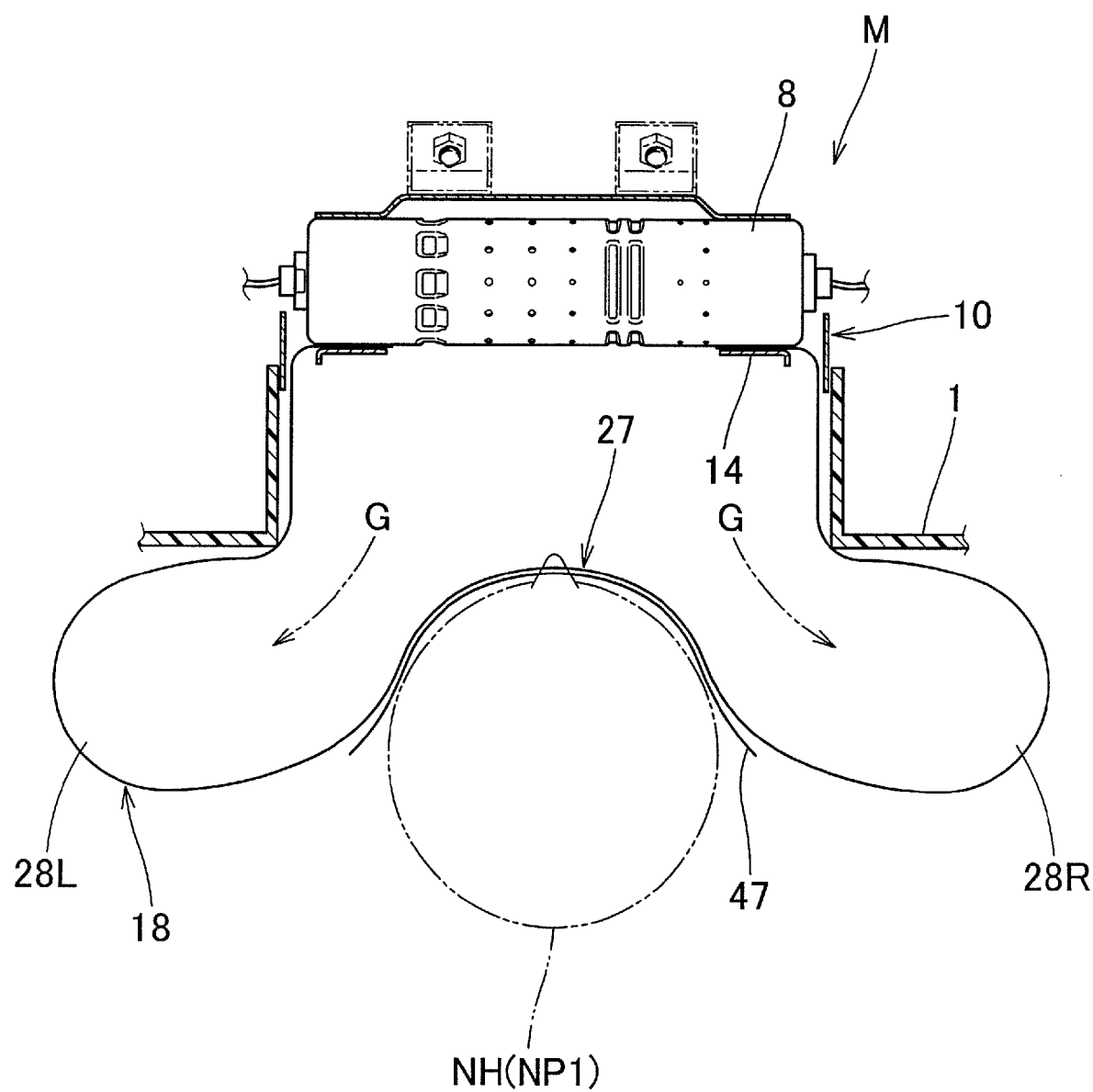
FIG. 16 is a schematic section taken along a left and right direction, showing the way the airbag of FIG. 3 is thrown against an out-of-position passenger.
Figure 17:
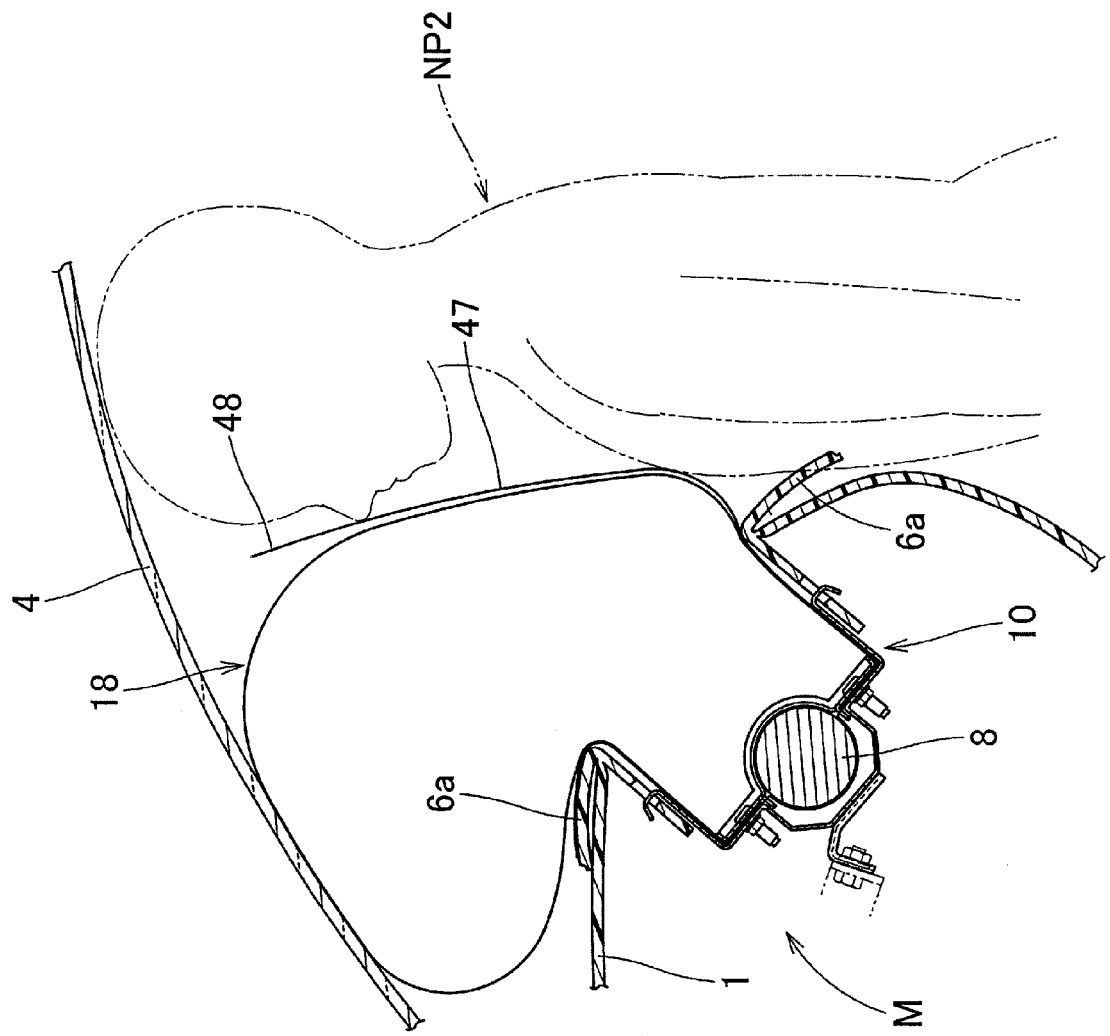
FIG. 17 is a schematic section taken along a front and rear direction, showing the way the airbag of FIG. 3 is thrown against a small out-of-position passenger.

Moreover, the cover portion 47 is continuously formed at the rear of the joint portion 43 which is secured to the case 10 or its vicinity together with the periphery 21 of the gas inlet port 21, and covers the rear side, the upper side, then the front side of the front-rear contracted bag 57 which is reduced in width in a front and rear direction relative to the preparatorily folded bag 53, in the folding process of the airbag 18. Accordingly, in the folded-up body 72 (i.e., in the folded-up configuration of the airbag 18), the left folded portion 69 and right folded portion 70, which are formed by the left-right contraction, are placed on the cover portion 47. With this configuration, in an initial phase of airbag deployment, the left folded portion 69 and right folded portion 70 emerge from the emergence opening 10a of the case 10 firstly and unfurl toward the left and right in a thin configuration having not yet admitted an inflation gas inside, while protruding rear- and upward. Thereafter, the front-rear contracted bag 57 wrapped by the cover portion 47 is fed with an inflation gas and protrudes out of the case 10, rear- and upward. At this time, since the leading end region 48 of the cover portion 47 is tucked down between the upper folded portion 63 and lower folded portion 64 on the front side of the front-rear contracted bag 57, the cover portion 47 will be prevented from being separated from the front-rear contracted bag 57 and keep wrapping up the front-rear contracted bag 57. As shown in FIGS. 15 to 17, accordingly, the cover portion 47 will securely deploy between the airbag 18 and an out-of-position object (e.g., an out-of-position passenger NP1/NP2), if any, in an initial phase of airbag deployment.

Furthermore, the leading end region 48 of the cover portion 47 tucked down between the upper folded portion 63 and lower folded portion 64 on the front side of the front-rear folded bag 57 is formed into such a bellows that the root side portion 48a, which is closer to the joint portion 43, is located to the upper folded portion 63 whereas the edge region 48b is located to the lower folded portion 64. With this configuration, the cover portion 47 will unfold and protrude upward along with the deployment of the front-rear contracted bag 57 when the front-rear contracted bag 57 unfolds and protrudes rear- and upward. That is, the cover portion 47 will be prevented from being separated from the airbag 18, and cover the airbag 18 over a wide area in a front and rear direction. Consequently, the cover portion 47 will be slippable relative to the airbag 18 over a wide area, and will prevent the airbag 18 from contacting an out-of-position object (e.g., an out-of-position passenger NP1/NP2) directly in an initial phase of deployment although the airbag apparatus M is a mid-mount design closer to the out-of-position object, and the cover portion 47 will enable the airbag 18 to slip over the out-of-position object (e.g., an out-of-position passenger NP1/NP2) smoothly. Accordingly, the airbag 18 will be kept from pressing the out-of-position object (e.g., an out-of-position passenger NP1/NP2) rearward in an undue fashion.

More specifically, in such a situation that a head NH of an out-of-position passenger NP1 leans against the top face of the doors 6a of the airbag cover 6, the airbag 18 unfurls the left folded portion 69 and right folded portion 70 such that the left portion 66 and right portion 67 of the front-rear contracted bag 57 slip over the head NH and extend toward the left and right, in a thin configuration having not yet admitted an inflation gas inside. When the front-rear contracted bag 57 then inflates with the inflation gas and protrudes rear- and upward while unfolding, the airbag 18 will inflate forward relative to the out-of-position passenger NP1 in a slipping manner (FIG. 15) due to the cover portion 47 located extendedly between the airbag 18 and the passenger NP1. As a consequence, the airbag 18 will be kept from pressing the head NH rearward forcefully.

In such a situation that an abdomen of a small out-of-position passenger NP2 contacts the dashboard 1 as shown in FIG. 17, when the front-rear contracted bag 57 unfolds and protrudes rear- and upward after extending to the left and right, the cover portion 47 will deploy forward and upward together with the airbag 18, without riding up from the airbag 18, and be located between the passenger NP2 and airbag 18 over a vertically wide area. Accordingly, the airbag 18 will be suppressed from pressing rearward an area from the upper body to the head of the passenger NP2 forcefully.

Therefore, the airbag apparatus M has a limited number of parts and is manufactured with a limited number of assembling processes. Further, being a mid-mount design, the airbag apparatus M is capable of suppressing its airbag 18 from pressing an out-of-position object such as an out-of-position passenger NP1/NP2, which is close to the case or housing 10, in an undue fashion.

Figure 18A:
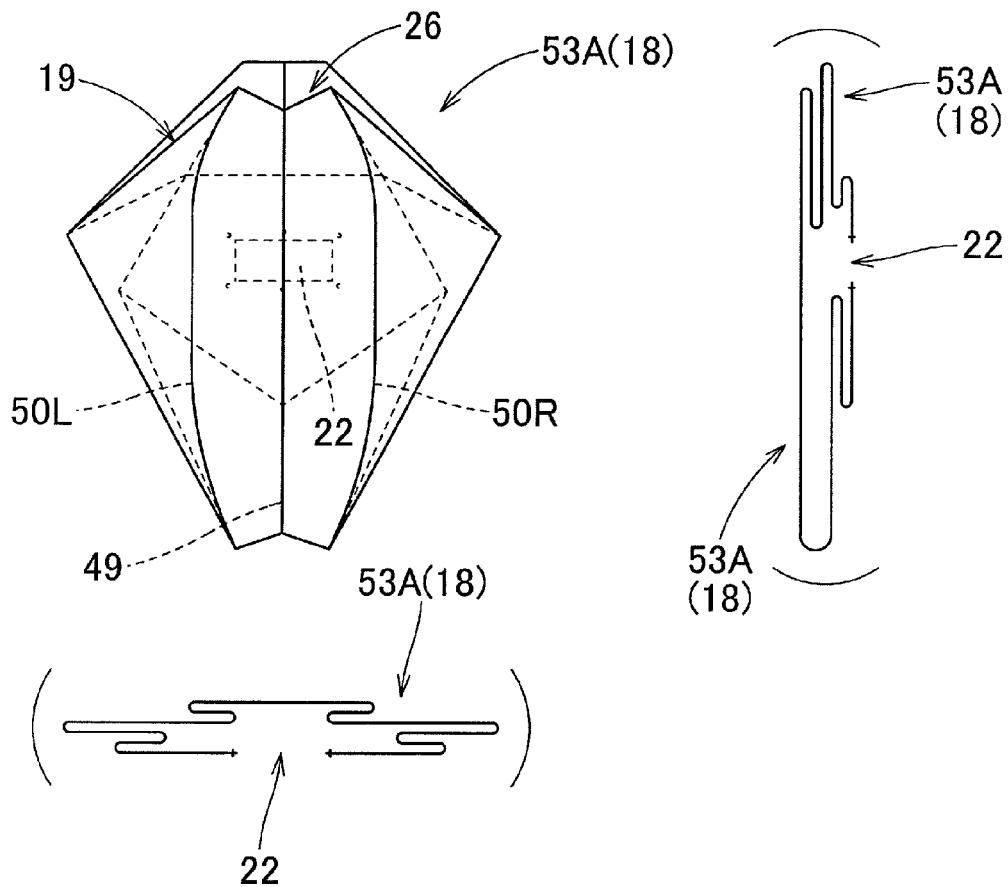
FIGS. 18A and 18B illustrate a folding process in an alternative embodiment.
Figure 18B:
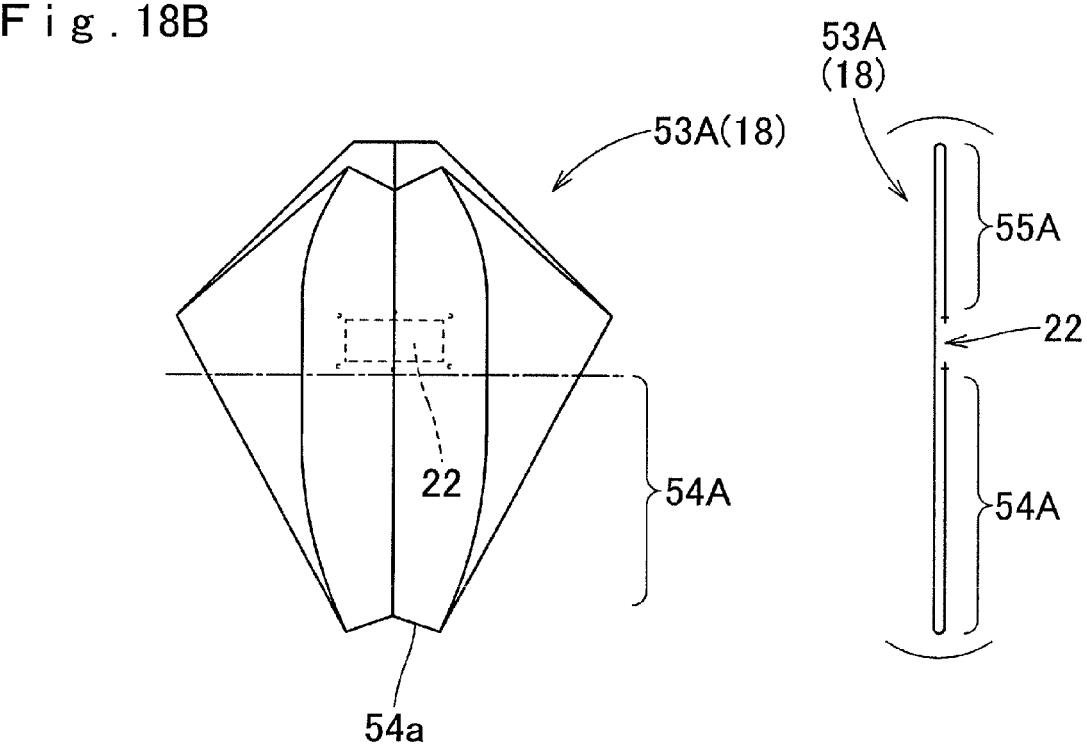
Figure 19A:
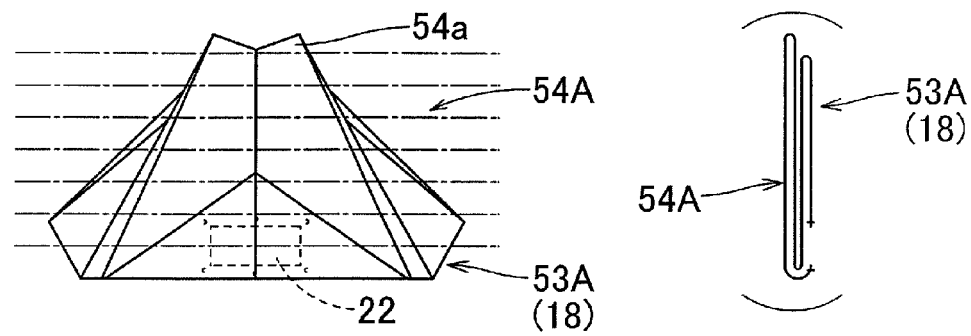
FIGS. 19A, 19B, 19C and 19D illustrate a folding step following the step shown in FIG. 18B.
Figure 19B:
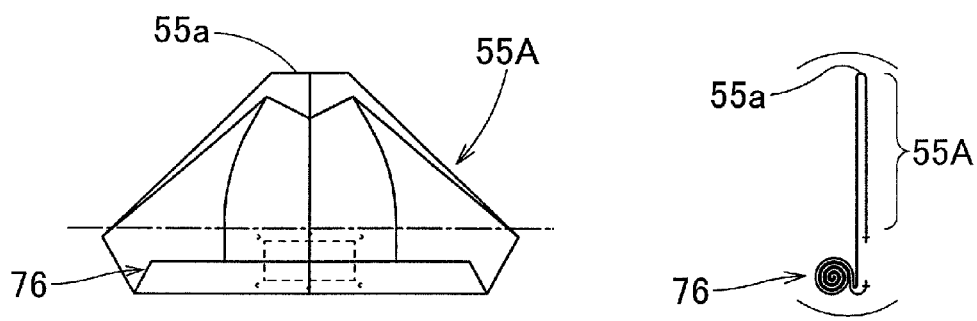
Figure 19C:
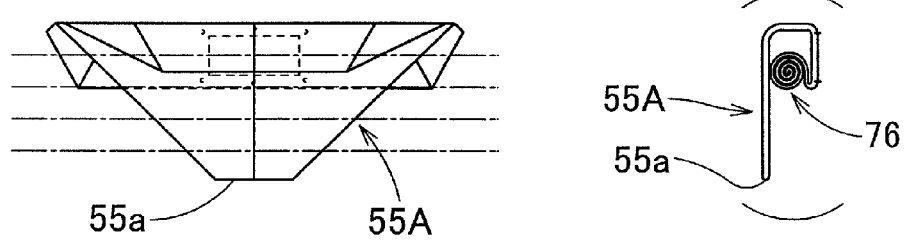
Figure 19D:
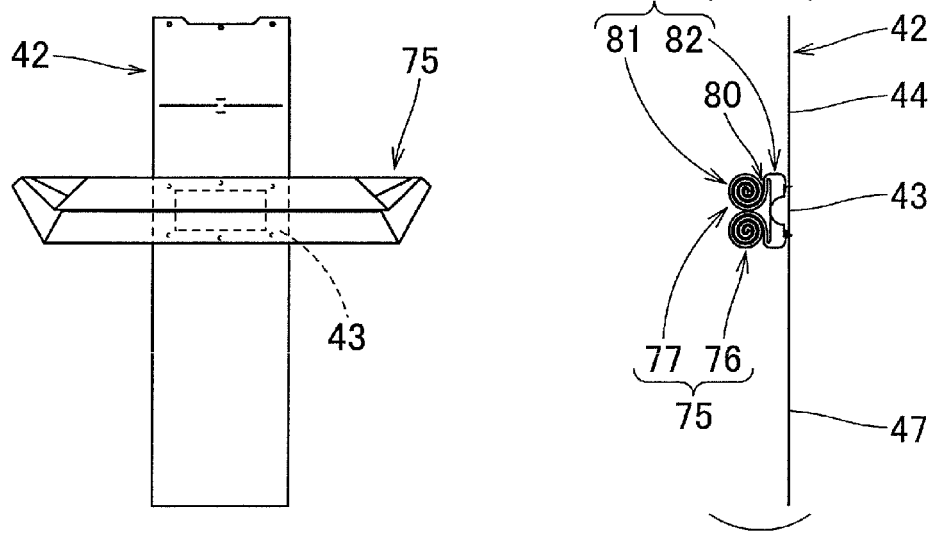
Figure 20A:
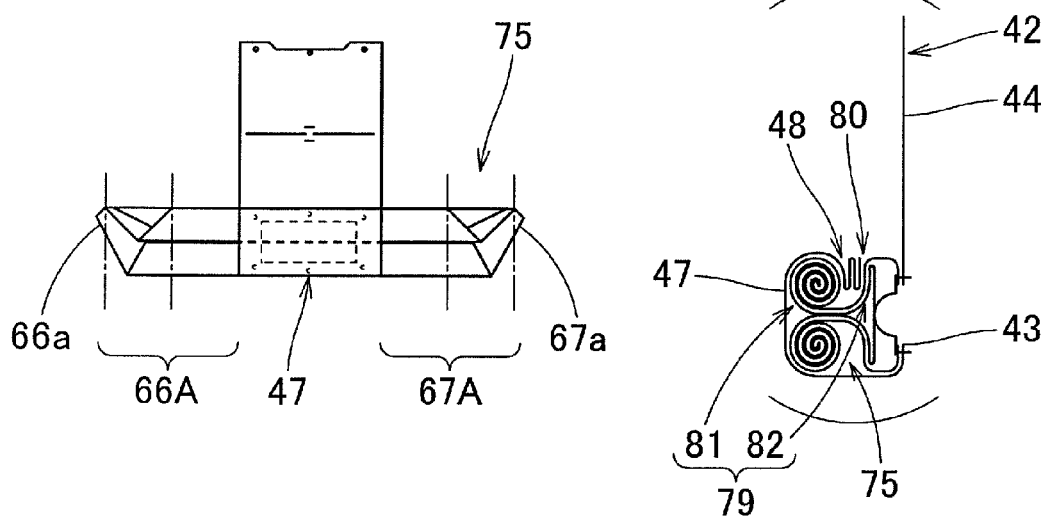
FIGS. 20A, 20B and 20C illustrate a folding step following the step shown in FIG. 19D.
Figure 20B:
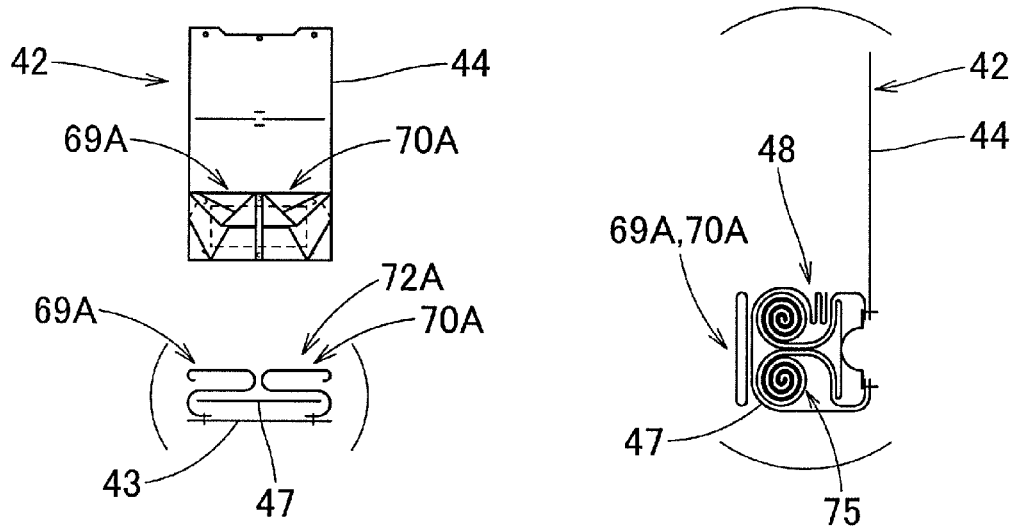
Figure 20C:
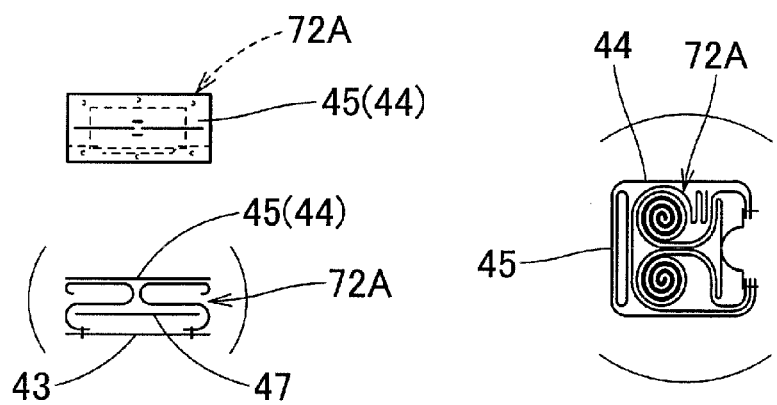

The airbag 18 may also be folded up as shown in FIGS. 18A to 20C. FIG. 18A shows a prepatarorily folded bag 53A which slightly differs from the preparatorily folded bag 53 in the foregoing embodiment in shape. In the following front-rear contraction step, the rear region 54A is rolled from the rear end 54a toward the circumferential wall 19 (i.e., on the underside) on creases extending in a left and right direction, thus providing a rear rolled portion 76 (or a rear folded portion). Then the front region 55A is rolled from the front end 55a toward the circumferential wall 19 (i.e., on the underside) on creases extending in a left and right direction, thus providing a front rolled portion 77 (or a front folded portion). The rear rolled portion 76 and the front rolled portion 77 are disposed side by side in a front and rear direction. In a front-rear contracted bag 75 thus formed, the front rolled portion 77 is turned over and placed on the gas inlet port 22 as shown in FIG. 19D, thus has an opening 80 at the turned position, which is openable forward. That is, the front-rear contracted bag 75 includes a piled (folded) portion 79 that is comprised of an upper folded portion 81, which is a part of the front rolled portion 77 located above the opening 80 and a lower folded portion 82, which is a portion of the front rolled portion 77 located below the opening 80 (FIG. 19D). Like the front-rear contracted bag 57 in the foregoing embodiment, the cover portion 47 of the wrapping member 42 is then wrapped around the front-rear contracted bag 75, and the leading end region 48 of the wrapping member 42 is formed into a bellows and tucked down between the upper folded portion 81 and lower folded portion 82 via the opening 80 as shown in FIGS. 19D and 20A. Then the bag 75 is subjected to the left-right contraction, in which the left folded portion 69A and right folded portion 70A are located on the cover portion 47. Thus a folded-up body 72A is provided. In the above folding process, the symbols "A" added to ends of reference numerals show that those regions of the airbag 18 are common with the folded-up body 72 in the foregoing embodiment. Detailed descriptions of those regions have been omitted.

In the passenger airbag apparatus M in the foregoing embodiment, the passenger side wall 26 of the airbag 18 includes the recess 27 that recesses forward at the center in a left and right direction and extends vertically through a generally entire area in an up and down direction of the passenger side wall 26 at full airbag inflation, and a pair of the raised regions 28L and 28R that relatively protrude rearward on the left and right of the recess 27. Moreover, in the preparatorily folded bag 53, the leading end of the recess 27 (i.e. sewn seam 49) is located at the center in a left and right direction whereas the leading ends of the raised regions 28L and 28R (i.e., the sewn seams 50L and 50R) are separated and respectively located on both sides relative to the leading end of the recess 27. This configuration will help redirect an inflation gas G fed into the airbag 18 toward the leading ends of the raised regions 28L and 28R as shown in FIG. 16, when the front-rear contraction is unfolded in an initial phase of airbag deployment, thus develop the airbag 18 in a left and right direction rather than rearward and upward (i.e., toward a passenger). As a consequence, the airbag 18 will be securely kept from pressing a head NH of an out-of-position passenger NP1, if any, in an undue fashion as shown in FIG. 16.

Furthermore, the airbag 18 in the foregoing embodiment includes internally the redirecting cloth 30 that redirect an inflation gas fed via the gas inlet port 22 forward and rearward. This configuration will help unfurl the airbag 18 in a front and rear direction rather than rearward and upward (i.e., toward a passenger) when the front-rear contraction is unfolded in an initial phase of inflation. Accordingly, the airbag 18 will be securely prevented from pressing an out-of-position object located close to the case 10, such as an out-of-position passenger NP1/NP2, in an undue fashion in an initial phase of deployment.

What is claimed is:

1. A mid-mount passenger airbag apparatus adapted to be mounted on a rear end area of a top plane of an instrument panel in front of a front passenger's seat of a vehicle, the apparatus comprising:
    a housing;
    an inflatable airbag housed in the housing in a folded-up configuration for deployment rearward and upward after emerging from the housing in the form of a generally square conical contour whose front end is the top of the square cone, the airbag including a passenger side wall that is deployable generally vertically at a rear end so as to face the front passenger's seat, a circumferential wall that extends forward from a peripheral edge of the passenger side wall in a narrowing fashion, and a gas inlet port that is located on an underside of the circumferential wall at deployment for taking an inflation gas into the airbag from an inflator, and the airbag being secured to the housing or its vicinity at a periphery of the gas inlet port; and a wrapping member that wraps up the airbag in the folded-up configuration, the wrapping member including:
- a joint portion that is secured to the housing or its vicinity together with the periphery of the gas inlet port;
- a main body that extends forward from the joint portion for covering a circumference of the airbag in the folded-up configuration; and
- a cover portion that extends rearward from the joint portion for deployment between the airbag and an out-of-position object, which is located close to the instrument panel, in an initial phase of airbag deployment, wherein the folded-up configuration of the airbag is made through a folding process comprising the steps of:
- preparatorily folding that folds at least the circumferential wall such that a central area in a left and right direction of a top region of the passenger side wall is brought close to the gas inlet port, thereby providing a prepatarorily folded bag;
- front-rear contraction that reduces a dimension in a front and rear direction of the prepatarorily folded bag while piling a folded portion above the gas inlet port, the folded portion including an upper folded portion and a lower folded portion which are openable forward, thereby providing a front-rear contracted bag;
- attaching the joint portion of the wrapping member to the periphery of the gas inlet port of the front-rear contracted bag;
- covering a circumference of the front-rear contracted bag with the cover portion of the wrapping member and tucking down a leading end region of the cover portion between the upper folded portion and lower folded portion;
- folding the leading end region of the cover portion into such a bellows that its region closer to the joint portion is located to the upper folded portion whereas its edge region is located to the lower folded portion; and
- left-right contraction that reduces a dimension in a left and right direction of the front-rear contracted bag and locates a portion of the bag here folded above the cover portion; and wherein the main body of the wrapping member wraps the outer circumference of the airbag in the folded-up configuration.

2. The airbag apparatus according to claim 1,
wherein the passenger side wall of the airbag includes a recess that recesses forward at the center in a left and right direction and extends vertically through a generally entire area in an up and down direction of the passenger side wall at full airbag inflation, and a pair of raised regions that relatively protrude rearward on the left and right of the recess; and
wherein, in the preparatorily folded bag, a leading end of the recess is located at the center in a left and right direction whereas leading ends of the raised regions are separated and respectively located on both sides of the leading end of the recess.

3. The airbag apparatus according to claim 1, wherein the airbag includes internally a redirecting cloth that redirect an inflation gas fed via the gas inlet port forward and rearward.

4. The airbag apparatus according to claim 1, wherein, in the front-rear contracted bag, a rear region of the preparatorily folded bag, which is located at the rear of the gas inlet port, is folded up and located above the gas inlet port, whereas a front region of the preparatorily folded bag, which is located in front of the gas inlet port, is folded up and located above the rear region.

5. The airbag apparatus according to claim 1, wherein, in the front-rear contracted bag, a front region of the preparatorily folded bag, which is located in front of the gas inlet port and a rear region of the preparatorily folded bag, which is located at the rear of the gas inlet port, are respectively folded up and disposed side by side in a front and rear direction.

* * * * *